US012682623B2

(12) United States Patent
Nag et al.

(10) Patent No.: US 12,682,623 B2
(45) Date of Patent: Jul. 14, 2026

(54) WEAKLY-SUPERVISED REFERRING EXPRESSION SEGMENTATION

(71) Applicant: Adobe Inc., San Jose, CA (US)

(72) Inventors: Sayan Nag, Toronto (CA); Koustava Goswami, Bangalore (IN); Srikrishna Karanam, Bangalore (IN)

(73) Assignee: Adobe Inc., San Jose, CA (US)

( * ) Notice: Subject to any disclaimer, the term of this patent is extended or adjusted under 35 U.S.C. 154(b) by 257 days.

(21) Appl. No.: 18/420,399

(22) Filed: Jan. 23, 2024

(65) Prior Publication Data

US 2025/0239059 A1 Jul. 24, 2025

(51) Int. Cl.
| | |
|---|---|
| *G06V 10/776* | (2022.01) |
| *G06F 40/279* | (2020.01) |
| *G06V 10/26* | (2022.01) |
| *G06V 10/74* | (2022.01) |
| *G06V 10/774* | (2022.01) |
| *G06V 10/80* | (2022.01) |

(52) U.S. Cl.
CPC .......... *G06V 10/776* (2022.01); *G06F 40/279* (2020.01); *G06V 10/26* (2022.01); *G06V 10/761* (2022.01); *G06V 10/774* (2022.01); *G06V 10/806* (2022.01)

(58) Field of Classification Search
CPC .. G06V 10/776; G06V 10/806; G06V 10/761; G06V 10/26; G06V 10/774; G06V 10/25; G06F 40/279; G06T 5/60; G06T 2207/20081; G06T 2207/20084
See application file for complete search history.

(56) References Cited

U.S. PATENT DOCUMENTS

2024/0013504 A1* 1/2024 Yu .......................... G06V 10/80

OTHER PUBLICATIONS

Qu, M., Wu, Y., Wei, Y., Liu, W., Liang, X., Zhao, Y.: Learning to segment every referring object point by point. In: CVPR, pp. 3021-3030 (2023) (Year: 2023).*

(Continued)

*Primary Examiner* — Utpal D Shah
*Assistant Examiner* — Jack Peter Kraynak
(74) *Attorney, Agent, or Firm* — Keller Preece PLLC

(57) ABSTRACT

The present disclosure relates to systems, methods, and non-transitory computer-readable media that modifies parameters of a fused feature extractor. In particular, the disclosed systems generate inferred masks from digital images and digital text prompts using a fused feature extractor. Furthermore, the disclosed systems identify a subset of the inferred masks that satisfy a validity threshold. Moreover, the disclosed systems generate an augmented training set by combining the subset of the inferred masks with a training set that includes the ground truth masks. Further, the disclosed systems generate object mask predictions from the augmented training set and determine ground truth and pseudo measures of loss by comparing the object mask predictions with the inferred masks and the ground truth masks. From the ground truth and pseudo measures of loss, the disclosed systems modify parameters of the fused feature extractors.

20 Claims, 16 Drawing Sheets

(56)     References Cited

OTHER PUBLICATIONS

Lee, J., Lee, S., Nam, J., Yu, S., Do, J., Taghavi, T.: Weakly supervised referring image segmentation with intra-chunk and inter-chunk consistency. In: Proceedings of the IEEE/CVF International Conference on Computer Vision, pp. 21870-21881 (2023) (Year: 2023).*

Wang, L., Huang, J., Li, Y., Xu, K., Yang, Z., & Yu, D. (2021). Improving weakly supervised visual grounding by contrastive knowledge distillation. In Proceedings of the IEEE/CVF conference on computer vision and pattern recognition (pp. 14090-14100). (Year: 2021).*

Eiras, F., Oksuz, K., Bibi, A., Torr, P. H., & Dokania, P. K. (2023). Segment, Select, Correct: A Framework for Weakly-Supervised Referring Segmentation. arXiv preprint arXiv:2310.13479. (Year: 2023).*

Strudel, R., Laptev, I., Schmid, C .: Weakly-supervised segmentation of referring expressions. arXiv preprint arXiv:2205.04725 ( 2022) (Year: 2022).*

Ye, L., Rochan, M., Liu, Z., & Wang, Y. (2019). Cross-modal self-attention network for referring image segmentation. In Proceedings of the IEEE/CVF conference on computer vision and pattern recognition (pp. 10502-10511). (Year: 2019).*

Subramanian, S., Merrill, W., Darrell, T., Gardner, M., Singh, S., & Rohrbach, A. (2022). Reclip: A strong zero-shot baseline for referring expression comprehension. arXiv preprint arXiv:2204.05991. (Year: 2022).*

Khoreva, A., Rohrbach, A., Schiele, B. (2019). Video Object Segmentation with Language Referring Expressions. In: Jawahar, C., Li, H., Mori, G., Schindler, K. (eds) Computer Vision—ACCV 2018. ACCV 2018. Lecture Notes in Computer Science(), vol. 11364. Springer, Cham. (Year: 2019).*

Zhu, C. et al. (2022). SeqTR: A Simple Yet Universal Network for Visual Grounding. In: Avidan, S., Brostow, G., Cissé, M., Farinella , G.M., Hassner, T. (eds) Computer Vision—ECCV 2022. ECCV 2022. Lecture Notes in Computer Science, vol. 13695. Springer, Cham. (Year: 2022).*

Kamath, A., Singh, M., LeCun, Y., Synnaeve, G., Misra, I., & Carion, N. (2021). Mdetr-modulated detection for end-to-end multimodal understanding. In Proceedings of the IEEE/CVF international conference on computer vision (pp. 1780-1790). (Year: 2021).*

Li, M., & Sigal, L. (2021). Referring transformer: A one-step approach to multi-task visual grounding. Advances in neural information processing systems, 34, 19652-19664. (Year: 2021).*

Adam Botach, Evgenii Zheltonozhskii, and Chaim Baskin. End-to-end referring video object segmentation with multimodal transformers. In CVPR, pp. 4985-4995, 2022.

Aishwarya Kamath, Mannat Singh, Yann LeCun, Gabriel Synnaeve, Ishan Misra, and Nicolas Carion. Mdetr-modulated detection for end-to-end multi-modal understanding. In ICCV, pp. 1780-1790, 2021.

Alec Radford, Jeffrey Wu, Rewon Child, David Luan, Dario Amodei, Ilya Sutskever, et al. Language models are unsupervised multitask learners. OpenAI blog, 1(8):9, 2019.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, and Ilya Sutskever. Learning transferable visual models from natural language supervision. In ICML, pp. 8748-8763, 2021.

Aleksandar Shtedritski, Christian Rupprecht, and Andrea Vedaldi. What does clip know about a red circle? visual prompt engineering for vlms. arXiv preprint arXiv:2304.06712, 2023.

Anna Khoreva, Anna Rohrbach, and Bernt Schiele. Video object segmentation with language referring expressions. In ACCV, pp. 123-141. Springer, 2019.

Chaoyang Zhu, Yiyi Zhou, Yunhang Shen, Gen Luo, Xingjia Pan, Mingbao Lin, Chao Chen, Liujuan Cao, Xiaoshuai Sun, and Rongrong Ji. Seqtr: A simple yet universal network for visual grounding. In ECCV, pp. 598-615, 2022.

Chenxi Liu, Zhe Lin, Xiaohui Shen, Jimei Yang, Xin Lu, and Alan Yuille. Recurrent multimodal interaction for referring image segmentation. In ICCV, pp. 1271-1280, 2017.

Colin Raffel, Noam Shazeer, Adam Roberts, Katherine Lee, Sharan Narang, Michael Matena, Yanqi Zhou, Wei Li, and Peter J. Liu. Exploring the limits of transfer learning with a unified text-to-text transformer. JMLR, 2020.

Daniel Bolya, Chong Zhou, Fanyi Xiao, and Yong Jae Lee. YOLACT: Real-time instance segmentation. In ICCV, pp. 9157-9166, 2019.

David Biertimpel, Sindi Shkodrani, Anil S Baslamisli, and Nora Baka. Prior to segment: Foreground cues for weakly annotated classes in partially supervised instance segmentation. In ICCV, pp. 2824-2833, 2021.

Ding-Jie Chen, Songhao Jia, Yi-Chen Lo, Hwann-Tzong Chen, and Tyng-Luh Liu. See-through-text grouping for referring image segmentation. In ICCV, pp. 7454-7463, 2019.

Edgar Margffoy-Tuay, Juan C Perez, Emilio Botero, and Pablo Arbelaez. Dynamic multimodal instance segmentation guided by natural language queries. In ECCV, pp. 630-645, 2018.

Fausto Milletari, Nassir Navab, and Seyed-Ahmad Ahmadi. V-net: Fully convolutional neural networks for volumetric medical image segmentation. In 3DV, pp. 565-571. IEEE, 2016.

Guang Feng, Zhiwei Hu, Lihe Zhang, and Huchuan Lu. Encoder fusion network with co-attention embedding for referring image segmentation. In CVPR, pp. 15506-15515, 2021.

Haotian Zhang, Pengchuan Zhang, Xiaowei Hu, Yen-Chun Chen, Liunian Li, Xiyang Dai, LijuanWang, Lu Yuan, Jenq-Neng Hwang, and Jianfeng Gao. Glipv2: Unifying localization and vision-language understanding. NeurIPS, 35: 36067-36080, 2022.

Hengcan Shi, Hongliang Li, Fanman Meng, and QingboWu. Key-word-aware network for referring expression image segmentation. In ECCV, pp. 38-54, 2018.

Henghui Ding, Chang Liu, SuchenWang, and Xudong Jiang. Vision-language transformer and query generation for referring segmentation. In ICCV, pp. 16321-16330, 2021.

Hugo Touvron, Thibaut Lavril, Gautier Izacard, Xavier Martinet, Marie-Anne Lachaux, Timoth'ee Lacroix, Baptiste Roziere, Naman Goyal, Eric Hambro, Faisal Azhar, et al. Llama: Open and efficient foundation language models. arXiv preprint arXiv:2302.13971, 2023.

Ilya Loshchilov and Frank Hutter. Decoupled weight decay regularization. arXiv preprint arXiv:1711.05101, 2017.

Ilya Sutskever, Oriol Vinyals, and Quoc V. Le. Sequence to sequence learning with neural networks. In NeurIPS, 2014.

Jiang Liu, Hui Ding, Zhaowei Cai, Yuting Zhang, Ravi Kumar Satzoda, Vijay Mahadevan, and R Manmatha. Polyformer: Referring image segmentation as sequential polygon generation. In CVPR, pp. 18653-18663, 2023.

Jiannan Wu, Yi Jiang, Peize Sun, Zehuan Yuan, and Ping Luo. Language as queries for referring video object segmentation. In CVPR, pp. 4974-4984, 2022.

Jiasen Lu, Dhruv Batra, Devi Parikh, and Stefan Lee. Vilbert: Pretraining task-agnostic visiolinguistic representations for vision-and-language tasks. In NeurIPS, 2019.

Jiasen Lu, Vedanuj Goswami, Marcus Rohrbach, Devi Parikh, and Stefan Lee. 12-in-1: Multi-task vision and language representation learning. In CVPR, pp. 10437-10446, 2020.

Jifeng Dai, Kaiming He, and Jian Sun. Instance-aware semantic segmentation via multi-task network cascades. In CVPR, pp. 3150-3158, 2016.

Junhua Mao, Jonathan Huang, Alexander Toshev, Oana Camburu, Alan L Yuille, and Kevin Murphy. Generation and comprehension of unambiguous object descriptions. In CVPR, pp. 11-20, 2016.

Junnan Li, Ramprasaath Selvaraju, Akhilesh Gotmare, Shafiq Joty, Caiming Xiong, and Steven Chu Hong Hoi. Align before fuse: Vision and language representation learning with momentum distillation. In NeurIPS, 2021.

Kai Chen, Jiangmiao Pang, Jiaqi Wang, Yu Xiong, Xiaoxiao Li, Shuyang Sun, Wansen Feng, Ziwei Liu, Jianping Shi, Wanli Ouyang, et al. Hybrid task cascade for instance segmentation. In CVPR, pp. 4974-4983, 2019.

Kaiming He, Georgia Gkioxari, Piotr Dollár, and Ross Girshick. Mask R-CNN. In ICCV, pp. 2961-2969, 2017.

(56)        References Cited

OTHER PUBLICATIONS

Kirill Gavrilyuk, Amir Ghodrati, Zhenyang Li, and Cees GM Snoek. Actor and action video segmentation from a sentence. In CVPR, pp. 5958-5966, 2018.

Kyunghyun Cho, Bart van Merrienboer, Caglar Gulcehre, Dzmitry Bahdanau, Fethi Bougares, Holger Schwenk, and Yoshua Bengio. Learning phrase representations using RNN encoder-decoder for statistical machine translation. In EMNLP, pp. 1724-1734, 2014.

Licheng Yu, Patrick Poirson, Shan Yang, Alexander C Berg, and Tamara L Berg. Modeling context in referring expressions. In ECCV, pp. 69-85, 2016.

Linwei Ye, Mrigank Rochan, Zhi Liu, and Yang Wang. Cross-modal self-attention network for referring image segmentation. In CVPR, pp. 10502-10511, 2019.

Liunian Harold Li, Pengchuan Zhang, Haotian Zhang, Jianwei Yang, Chunyuan Li, Yiwu Zhong, Lijuan Wang, Lu Yuan, Lei Zhang, Jenq-Neng Hwang, et al. Grounded language-image pre-training. In CVPR, pp. 10965-10975, 2022.

Maithra Raghu, Thomas Unterthiner, Simon Kornblith, Chiyuan Zhang, and Alexey Dosovitskiy. Do vision transformers see like convolutional neural networks? NeurIPS, 34:12116-12128, 2021.

Mengxue Qu, YuWu, YunchaoWei,Wu Liu, Xiaodan Liang, and Yao Zhao. Learning to segment every referring object point by point. In CVPR, pp. 3021-3030, 2023.

Muchen Li and Leonid Sigal. Referring transformer: A one-step approach to multi-task visual grounding. In NeurIPS, 2021.

Namyup Kim, Dongwon Kim, Cuiling Lan, Wenjun Zeng, and Suha Kwak. Restr: Convolution-free referring image segmentation using transformers. In CVPR, pp. 18145-18154, 2022.

Pengchuan Zhang, Xiujun Li, Xiaowei Hu, Jianwei Yang, Lei Zhang, Lijuan Wang, Yejin Choi, and Jianfeng Gao. Vinvl: Revisiting visual representations in vision-language models. In CVPR, pp. 5579-5588, 2021.

Qi Fan, Lei Ke, Wenjie Pei, Chi-Keung Tang, and Yu-Wing Tai. Commonality-parsing network across shape and appearance for partially supervised instance segmentation. In ECCV, pp. 379-396. Springer, 2020.

Ronghang Hu, Marcus Rohrbach, and Trevor Darrell. Segmentation from natural language expressions. In ECCV, pp. 108-124, 2016.

Ruiyu Li, Kaican Li, Yi-Chun Kuo, Michelle Shu, Xiaojuan Qi, Xiaoyong Shen, and Jiaya Jia. Referring image segmentation via recurrent refinement networks. In CVPR, pp. 5745-5753, 2018.

Sanjay Subramanian, William Merrill, Trevor Darrell, Matt Gardner, Sameer Singh, and Anna Rohrbach. Reclip: A strong zero-shot baseline for referring expression comprehension. arXiv preprint arXiv:2204.05991, 2022.

Seonguk Seo, Joon-Young Lee, and Bohyung Han. Urvos: Unified referring video object segmentation network with a large-scale benchmark. In ECCV, pp. 208-223, 2020.

Shaofei Huang, Tianrui Hui, Si Liu, Guanbin Li, Yunchao Wei, Jizhong Han, Luoqi Liu, and Bo Li. Referring image segmentation via cross-modal progressive comprehension. In CVPR, pp. 10488-10497, 2020.

Shaoqing Ren, Kaiming He, Ross Girshick, and Jian Sun. Faster r-cnn: Towards real-time object detection with region proposal networks. NeurIPS, 28, 2015.

Shu Liu, Lu Qi, Haifang Qin, Jianping Shi, and Jiaya Jia. Path aggregation network for instance segmentation. In CVPR, pp. 8759-8768, 2018.

Sibei Yang, Meng Xia, Guanbin Li, Hong-Yu Zhou, and Yizhou Yu. Bottom-up shift and reasoning for referring image segmentation. In CVPR, pp. 11266-11275, 2021.

Tianrui Hui, Si Liu, Shaofei Huang, Guanbin Li, Sansi Yu, Faxi Zhang, and Jizhong Han. Linguistic structure guided context modeling for referring image segmentation. In ECCV, pp. 59-75, 2020.

Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. Language models are few-shot learners. In NeurIPS, 2020.

Varun K Nagaraja, Vlad I Morariu, and Larry S Davis. Modeling context between objects for referring expression understanding. In ECCV, pp. 792-807, 2016.

Xiujun Li, Xi Yin, Chunyuan Li, Pengchuan Zhang, Xiaowei Hu, Lei Zhang, Lijuan Wang, Houdong Hu, Li Dong, Furu Wei, et al. Oscar: Object-semantics aligned pre-training for vision-language tasks. In ECCV, pp. 121-137. Springer, 2020.

Ya Jing, Tao Kong, Wei Wang, Liang Wang, Lei Li, and Tieniu Tan. Locate then segment: A strong pipeline for referring image segmentation. In CVPR, pp. 9858-9867, 2021.

Yanzhao Zhou, Xin Wang, Jianbin Jiao, Trevor Darrell, and Fisher Yu. Learning saliency propagation for semi-supervised instance segmentation. In CVPR, pp. 10307-10316, 2020.

Yen-Chun Chen, Linjie Li, Licheng Yu, Ahmed El Kholy, Faisal Ahmed, Zhe Gan, Yu Cheng, and Jingjing Liu. Uniter: Universal image-text representation learning. In ECCV, pp. 104-120, 2020.

Yinhan Liu, Myle Ott, Naman Goyal, Jingfei Du, Mandar Joshi, Danqi Chen, Omer Levy, Mike Lewis, Luke Zettlemoyer, and Veselin Stoyanov. Roberta: A robustly optimized bert pretraining approach. arXiv preprint arXiv:1907.11692, 2019.

Ze Liu, Yutong Lin, Yue Cao, Han Hu, Yixuan Wei, Zheng Zhang, Stephen Lin, and Baining Guo. Swin transformer: Hierarchical vision transformer using shifted windows. In ICCV, pp. 10012-10022, 2021.

Zhao Yang, Jiaqi Wang, Yansong Tang, Kai Chen, Heng-shuang Zhao, and Philip HS Torr. LAVT: Language-Aware Vision Transformer for Referring Image Segmentation. In CVPR, pp. 18155-18165, 2022.

Zhaoqing Wang, Yu Lu, Qiang Li, Xunqiang Tao, Yandong Guo, Mingming Gong, and Tongliang Liu. CRIS: Clip-driven referring image segmentation. In CVPR, pp. 11686-11695, 2022.

Zhengyuan Yang, Zhe Gan, Jianfeng Wang, Xiaowei Hu, Faisal Ahmed, Zicheng Liu, Yumao Lu, and Lijuan Wang. Unitab: Unifying text and box outputs for grounded vision language modeling. In ECCV, pp. 521-539, 2022.

Zhiwei Hu, Guang Feng, Jiayu Sun, Lihe Zhang, and Huchuan Lu. Bi-directional relationship inferring network for referring image segmentation. In CVPR, pp. 4424-4433, 2020.

Zi-Yi Dou, Yichong Xu, Zhe Gan, Jianfeng Wang, Shuohang Wang, Lijuan Wang, Chenguang Zhu, Pengchuan Zhang, Lu Yuan, Nanyun Peng, et al. An empirical study of training end-to-end vision-and-language transformers. In CVPR, pp. 18166-18176, 2022.

* cited by examiner

| Label-Rate | Cross-Attn. | AMCR | RefCOCO val | RefCOCO testA | RefCOCO testB |
|---|---|---|---|---|---|
| 100 | ✗ | ✗ | 68.84 | 70.59 | 65.85 |
|  | ✓ | ✗ | 72.41 | 74.65 | 69.96 |
|  | ✓ | ✓ | 73.35 | 75.02 | 70.71 |
| 30 | ✗ | ✗ | 60.91 | 64.06 | 57.73 |
|  | ✓ | ✗ | 64.72 | 67.55 | 60.91 |
|  | ✓ | ✓ | 67.04 | 69.17 | 64.23 |
| 10 | ✗ | ✗ | 54.06 | 55.64 | 52.61 |
|  | ✓ | ✗ | 60.11 | 62.18 | 57.95 |
|  | ✓ | ✓ | 64.02 | 65.91 | 61.76 |

*Fig. 6B*

| Label-Rate Mask | BBox | Method | Vis. Backbone | RefCOCO val | testA | testB | RefCOCO+ val | testA | testB | RefCOCOg val-g | val-u | test-u |
|---|---|---|---|---|---|---|---|---|---|---|---|---|
| | | | | *Fully Supervised Models* | | | | | | | | |
| 100% | 100% | LTS [ ] | DN53 | 65.43 | 67.76 | 63.08 | 54.21 | 58.32 | 48.02 | 49.76 | 54.40 | 54.25 |
| | | VLT [ ] | DN56 | 65.65 | 68.29 | 62.73 | 55.50 | 59.20 | 49.36 | 54.48 | 52.99 | 56.65 |
| | | ResTR [ ] | ViT-B | 67.22 | 69.30 | 64.45 | 55.78 | 60.44 | 48.27 | - | 55.67 | 55.64 |
| | | SeqTR [ ] | DN53 | 67.26 | 69.79 | 64.12 | 54.14 | 58.93 | 48.19 | - | 62.42 | 62.74 |
| | | SAFARI (Ours) | Swin-B | 73.35 | 75.02 | 70.71 | 63.03 | 65.81 | 57.64 | - | 62.42 | 7.10↑ |
| | | Δ Ours - SeqTR | | 6.09↑ | 5.23↑ | 6.59↑ | 8.89↑ | 6.88↑ | 9.45↑ | - | 6.75↑ | 7.10↑ |
| | | PolyFormer [ ]* | Swin-B | 75.96 | 77.09 | 73.22 | 70.65 | 74.51 | 64.64 | - | 69.36 | 69.88 |
| | | SAFARI† (Ours) | Swin-B | 77.21 | 77.83 | 75.72 | 78.78 | 74.53 | 64.88 | - | 70.48 | 71.06 |
| | | Δ Ours - PolyFormer† | | 1.25↑ | 0.74↑ | 2.50↑ | 0.13↑ | 0.02↑ | 0.24↑ | - | 1.12↑ | 1.18↑ |
| | | | | *Weakly Supervised Models* | | | | | | | | |
| 30% | 100% | Partial-RES [ ] | DN53 | 65.80 | 67.98 | 63.17 | 54.03 | 57.85 | 47.76 | - | 54.27 | 54.21 |
| | | SAFARI (Ours) | Swin-B | 67.04 | 69.17 | 64.23 | 54.98 | 59.31 | 48.26 | - | 55.72 | 55.83 |
| | | Δ Ours - Partial-RES | | 1.24↑ | 1.19↑ | 1.06↑ | 0.95↑ | 1.46↑ | 0.50↑ | - | 1.45↑ | 1.62↑ |
| 20% | 100% | Partial-RES [ ] | DN53 | 64.95 | 66.92 | 62.59 | 53.41 | 56.76 | 47.25 | - | 53.38 | 53.37 |
| | | SAFARI (Ours) | Swin-B | 65.88 | 67.96 | 63.24 | 54.23 | 58.07 | 47.67 | - | 54.45 | 54.61 |
| | | Δ Ours - Partial-RES | | 0.93↑ | 1.04↑ | 0.65↑ | 0.82↑ | 1.31↑ | 0.42↑ | - | 1.07↑ | 1.24↑ |
| 10% | 100% | Partial-RES [ ] | DN53 | 63.99 | 65.86 | 61.54 | 52.56 | 55.79 | 46.09 | - | 52.43 | 52.40 |
| | | SAFARI (Ours) | Swin-B | 64.02 | 65.91 | 61.76 | 52.98 | 56.24 | 46.48 | - | 52.91 | 52.94 |
| | | Δ Ours - Partial-RES | | 0.03↑ | 0.05↑ | 0.23↑ | 0.42↑ | 0.45↑ | 0.39↑ | - | 0.48↑ | 0.54↑ |

*Fig. 7*

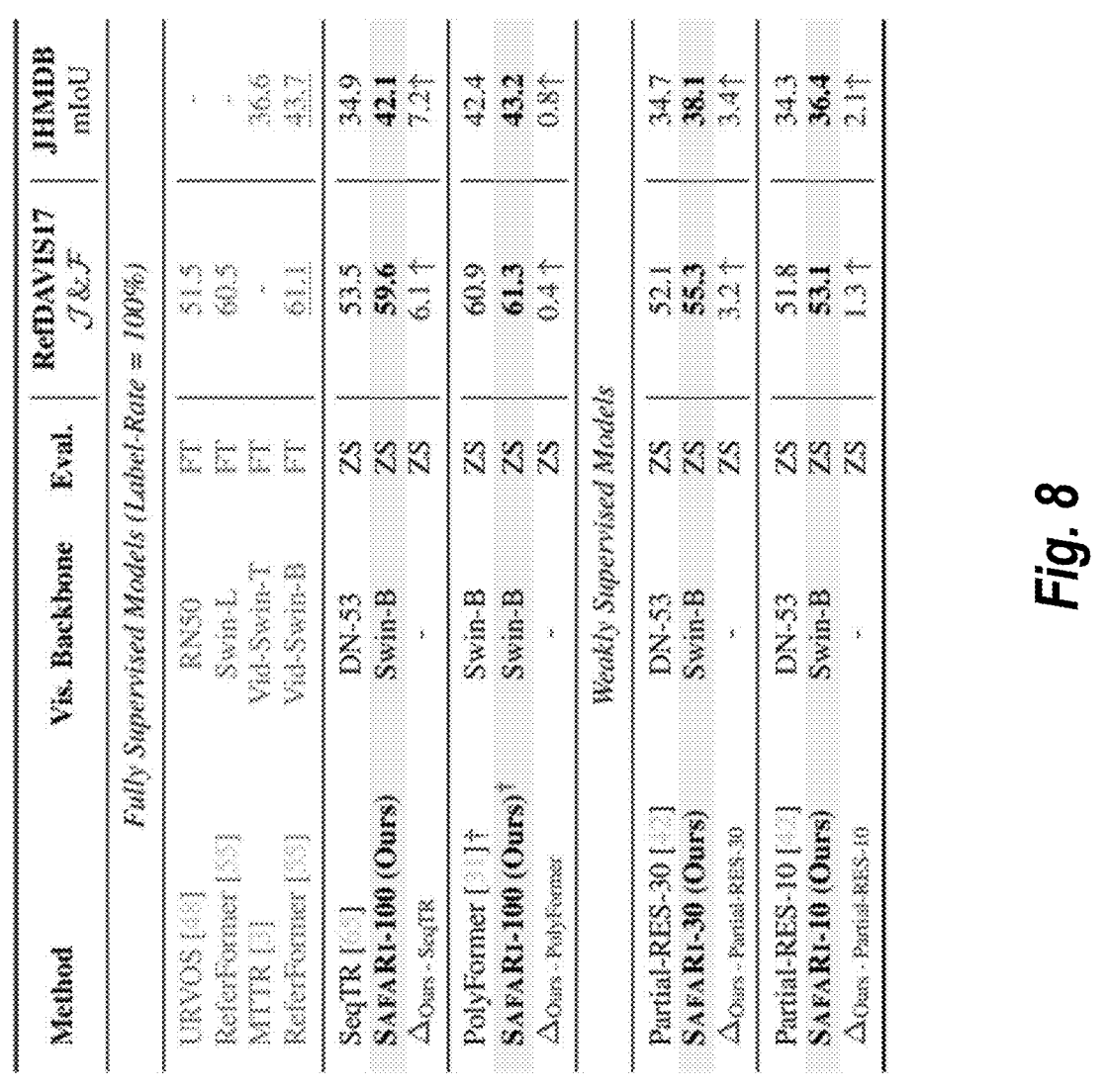

| Method | Vis. Backbone | Eval. | RefDAVIS17 $\mathcal{J\&F}$ | JHMDB mIoU |
|---|---|---|---|---|
| *Fully Supervised Models (Label-Rate = 100%)* | | | | |
| URVOS [ ] | RN50 | FT | 51.5 | - |
| ReferFormer [ ] | Swin-L | FT | 60.3 | - |
| MTTR [ ] | Vid-Swin-T | FT | - | 36.6 |
| ReferFormer [ ] | Vid-Swin-B | FT | 61.1 | 43.7 |
| SeqTR [ ] | DN-53 | ZS | 53.5 | 34.9 |
| SAFARI-100 (Ours) | Swin-B | ZS | 59.6 | 42.1 |
| Δ Ours - SeqTR | - | | 6.1↑ | 7.2↑ |
| PolyFormer [ ]† | Swin-B | ZS | 60.9 | 42.4 |
| SAFARI-100 (Ours)† | Swin-B | ZS | 61.3 | 43.2 |
| Δ Ours - PolyFormer | - | | 0.4↑ | 0.8↑ |
| *Weakly Supervised Models* | | | | |
| Partial-RES-30 [ ] | DN-53 | ZS | 52.1 | 34.7 |
| SAFARI-30 (Ours) | Swin-B | ZS | 55.3 | 38.1 |
| Δ Ours - Partial-RES-30 | - | | 3.2↑ | 3.4↑ |
| Partial-RES-10 [ ] | DN-53 | ZS | 51.8 | 34.3 |
| SAFARI-10 (Ours) | Swin-B | ZS | 53.1 | 36.4 |
| Δ Ours - Partial-RES-10 | - | | 1.3↑ | 2.1↑ |

*Fig. 8*

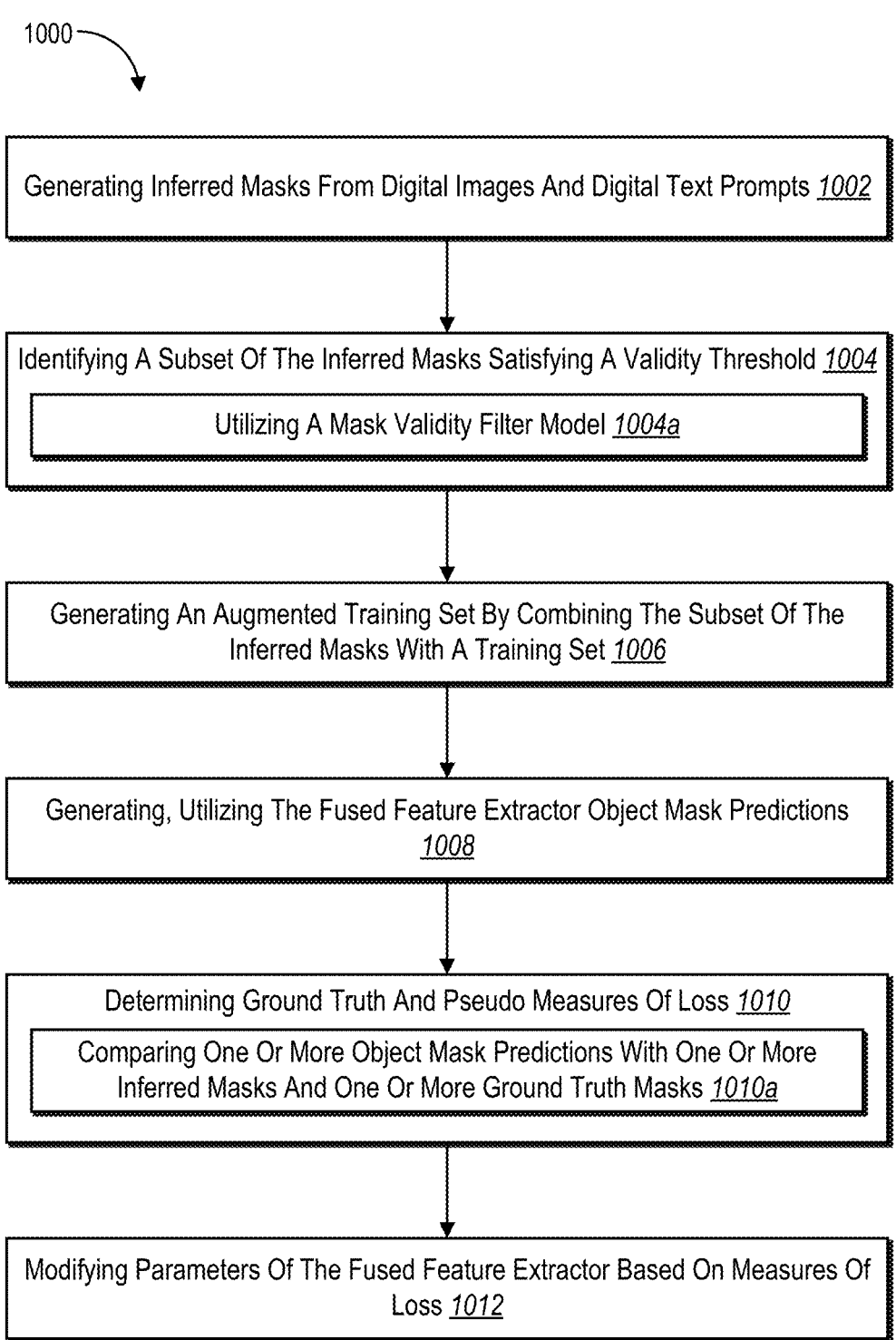

1000

Generating Inferred Masks From Digital Images And Digital Text Prompts *1002*

Identifying A Subset Of The Inferred Masks Satisfying A Validity Threshold *1004*

Utilizing A Mask Validity Filter Model *1004a*

Generating An Augmented Training Set By Combining The Subset Of The Inferred Masks With A Training Set *1006*

Generating, Utilizing The Fused Feature Extractor Object Mask Predictions *1008*

Determining Ground Truth And Pseudo Measures Of Loss *1010*

Comparing One Or More Object Mask Predictions With One Or More Inferred Masks And One Or More Ground Truth Masks *1010a*

Modifying Parameters Of The Fused Feature Extractor Based On Measures Of Loss *1012*

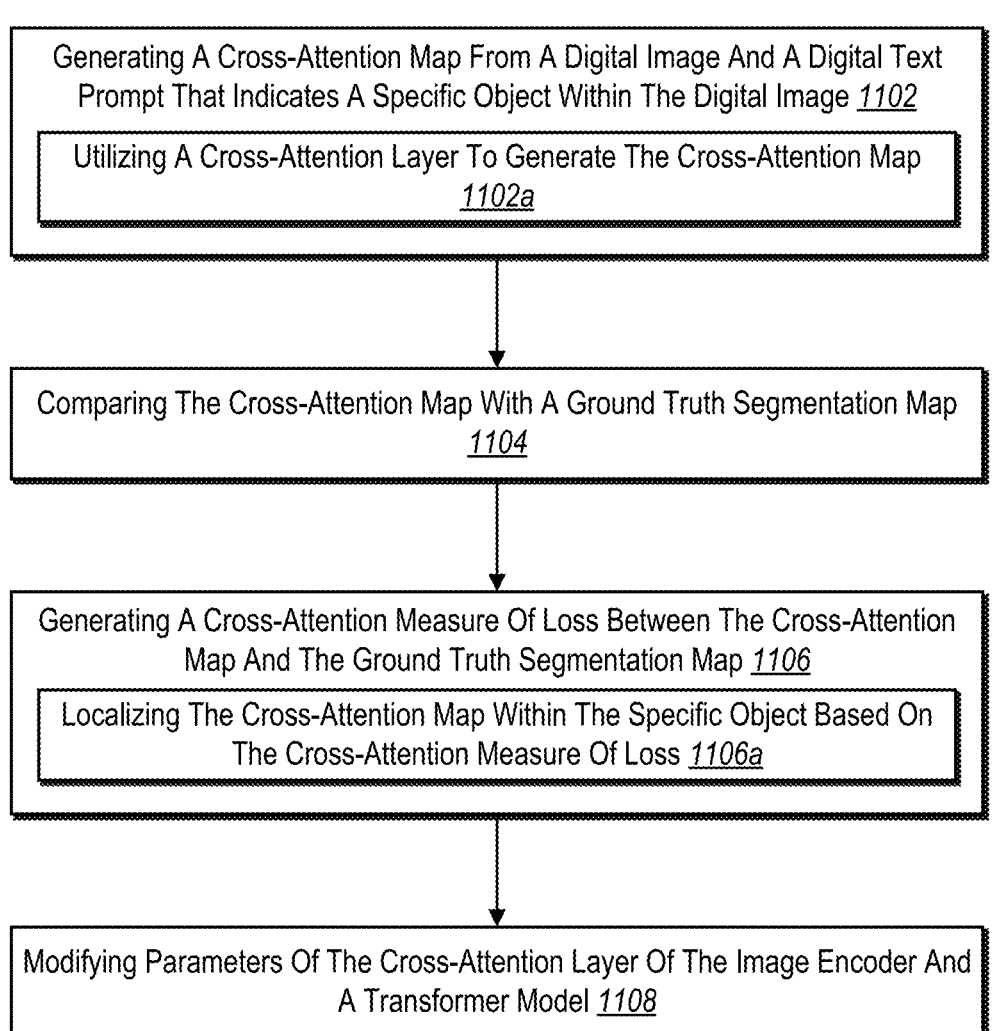

Generating A Cross-Attention Map From A Digital Image And A Digital Text Prompt That Indicates A Specific Object Within The Digital Image *1102*

Utilizing A Cross-Attention Layer To Generate The Cross-Attention Map *1102a*

Comparing The Cross-Attention Map With A Ground Truth Segmentation Map *1104*

Generating A Cross-Attention Measure Of Loss Between The Cross-Attention Map And The Ground Truth Segmentation Map *1106*

Localizing The Cross-Attention Map Within The Specific Object Based On The Cross-Attention Measure Of Loss *1106a*

Modifying Parameters Of The Cross-Attention Layer Of The Image Encoder And A Transformer Model *1108*

*Fig. 11*

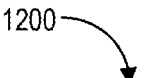

1200

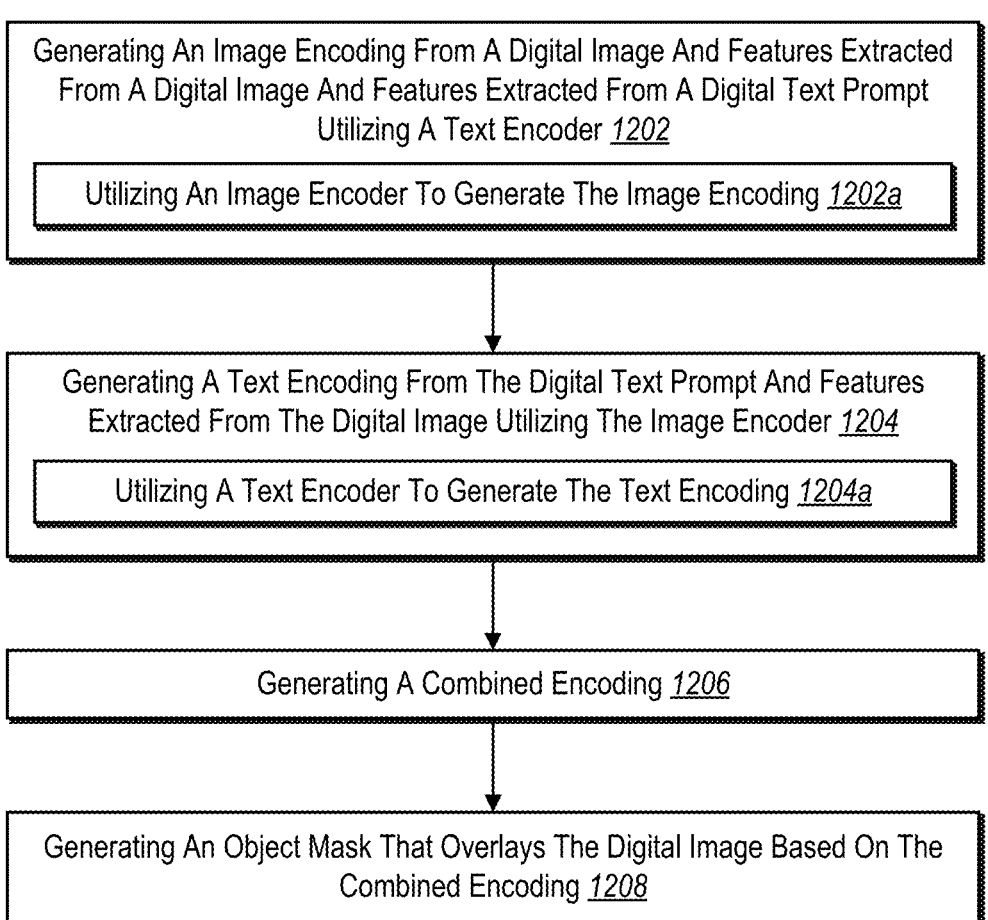

Generating An Image Encoding From A Digital Image And Features Extracted From A Digital Image And Features Extracted From A Digital Text Prompt Utilizing A Text Encoder *1202*

Utilizing An Image Encoder To Generate The Image Encoding *1202a*

Generating A Text Encoding From The Digital Text Prompt And Features Extracted From The Digital Image Utilizing The Image Encoder *1204*

Utilizing A Text Encoder To Generate The Text Encoding *1204a*

Generating A Combined Encoding *1206*

Generating An Object Mask That Overlays The Digital Image Based On The Combined Encoding *1208*

*Fig. 12*

WEAKLY-SUPERVISED REFERRING EXPRESSION SEGMENTATION

BACKGROUND

Recent years have seen significant advancement in hardware and software platforms for segmenting objects of a digital image referred to in the text of a prompt. For example, many software platforms utilize text and image models trained on datasets with abundant annotations. For instance, many of these text and image models plausibly segment specific objects within a digital image when trained on abundantly annotated ground-truth mask datasets. However, despite these advancements, existing software platform systems with text and image models continue to suffer from a variety of problems with regard to computational efficiency, computational accuracy, and operational flexibility of implementing computing devices.

SUMMARY

One or more embodiments described herein provide benefits and/or solve one or more of the problems in the art with systems, methods, and non-transitory computer-readable media that implement a pipeline for referring expression segmentation that takes limited available mask annotations and has self-improving capabilities to generate mask labels. In some embodiments, the disclosed systems implement a weakly-supervised bootstrapping architecture that includes utilizing cross-attention-based feature fusion. Moreover, as part of the bootstrapping, the disclosed systems introduce pseudo-labeling of unlabeled samples of a training dataset and a filter mechanism to validate one or more pseudo-labels. Further, in some embodiments, to further enhance spatial localization of a target object in a digital image, the disclosed systems utilize a novel attention mask consistency regularization model. Once trained, the disclosed systems provide a segmentation mask of a target object in a digital image referred to by text (e.g., a text prompt). Therefore, in some embodiments, at inference time the disclosed systems more accurately generate segmentation masks for a target object referred to by text.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 6A-6B illustrates the impact of the cross-attention measure of loss in accordance with one or more implementations;

FIG. 7 illustrates a table showing a comparison of performance of the referring expression segmentation system and prior systems segmenting target objects in a digital image in accordance with one or more implementations;

FIG. 8 illustrates a table showing results of the referring expression segmentation system segmenting target objects in a digital image in a zero-shot setting compared to prior systems in accordance with one or more implementations;

FIG. 10 illustrates a flowchart of a series of acts for modifying parameters of a fused feature extractor based on a ground truth and pseudo measure of loss in accordance with one or more implementations;

FIG. 11 illustrates a flowchart of a series of acts for modifying parameters of a fused feature extractor and a transformer based on a cross-attention measure of loss in accordance with one or more implementations;

FIG. 12 illustrates a flowchart of a series of acts for generating an object mask for a target object referred to be a digital text prompt in accordance with one or more implementations;

DETAILED DESCRIPTION

Figure 1:
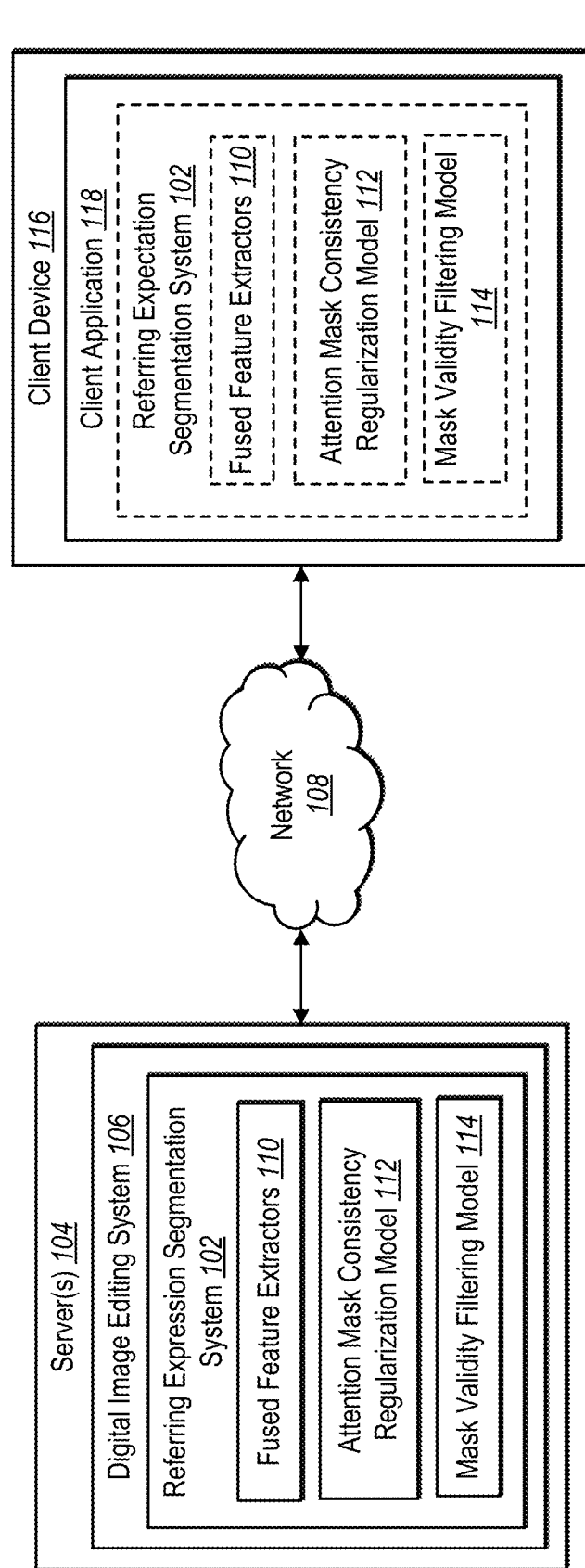
FIG. 1 illustrates an example environment in which a referring expression segmentation system operates in accordance with one or more implementations.

One or more embodiments described herein include a weakly-supervised referring expression segmentation pipeline that augments a training set (e.g., containing some ground truth masks) with inferred masks (e.g., pseudo-labeled masks) to enhance the ability of the pipeline to generate segmentation masks of target objects in a digital image referred to by text. In some instances, the referring expression segmentation system implements weakly-supervised training by utilizing a training set that contains a small fraction (e.g., 10%) of ground truth masks. Specifically, the referring expression segmentation system augments the training set with the inferred masks and further filters the inferred masks by utilizing mask validity filtering. Moreover, in some embodiments, the referring expression segmentation system further integrates an attention mask consistency regularization loss to enhance spatial localization of a target object in a digital image. In doing so, the referring expression segmentation system enhances the ability of models to segment masks of target objects in a digital image, where the target object is referred to by text.

As mentioned, the referring expression segmentation system augments the training set with the inferred masks. Indeed, in some embodiments, the referring expression segmentation system utilizes a fused feature extractor to generate the inferred masks from digital images and digital text prompts. For example, the referring expression segmentation system introduces fused feature extractors which includes a novel application of normalized gated cross-attention based backbone fusion. In other words, the fused feature extractors include an architecture of an image encoder and a text encoder where the image encoder generates an image encoding from a digital image and features extracted from a digital text prompt utilizing a text encoder (e.g., and vice versa). In some instances, the fused feature extract with the gated cross-attention based backbone improves the prediction performance due to the referring expression segmentation system facilitating cross-model alignment between two different modalities (e.g., image and language).

As mentioned, in some embodiments, the referring expression segmentation system utilizes attention mask consistency regularization loss. For example, the attention mask consistency regularization loss fosters the prediction of high-quality masks and improved cross-modal alignment quality (e.g., especially so in the instance of limited ground truth annotations within the training set). For instance, the attention mask consistency regularization loss includes the referring expression segmentation system localizing a cross-attention map within a specific object indicated by a text prompt and preventing collapse of the cross-attention map within the object.

In some embodiments, to further bolster performance of generating segmentation masks, the referring expression segmentation system injects self-labelling capabilities by implementing a weak-supervision operation. For example, as mentioned, the referring expression segmentation system augments a training set with inferred masks. To do so, the referring expression segmentation system generates inferred masks from digital images and digital text prompts, and further filters the inferred masks (e.g., based on certain requirements) to identify validly inferred masks. Moreover, the referring expression segmentation system re-utilizes the validly identified inferred masks in subsequent training iterations.

As just mentioned, the referring expression segmentation system filters the inferred masks. For example, the referring expression segmentation system utilizes a novel mask validity filtering method that takes a zero-shot (e.g., a model performs a task without being trained on any specific examples for that particular task) referring expression comprehension approach (e.g., understanding what target object a digital text prompt is referring to). For instance, the referring expression segmentation system performs the mask validity filtering by combining a model that understands relationships between text and image and spatial reasoning models.

As mentioned above, many conventional systems suffer from a number of issues in relation to efficiency, accuracy, and operational flexibility. Specifically, conventional systems suffer from computational inefficiencies in training models to generate segmentation masks for a target object in a digital image referred to by text. For example, conventional systems typically require large-scale mask annotations within a training set to train a model to perform the task of segmenting a target object referred to by a digital text prompt. Indeed, annotating ground truth masks requires an excessive number of developer device interactions and computing resources. Thus, large-scale mask annotations consume significant computational resources. In other words, it is computationally expensive for conventional systems to train a model to generate segmentation masks for target objects referred to by text (e.g., computationally expensive to obtain a training set that contains large-scale ground truth masks).

Moreover, conventional systems further suffer from computational inaccuracies. For example, conventional systems utilize techniques that involve fully-supervised referring expression segmentation. Specifically, conventional systems utilize dense binary classification models to predict if every pixel is part of an object. However, such an approach fails to account for relationships between neighboring pixels and further lacks structural information of the object being segmented. Some conventional systems try to overcome this problem by using a contour-based approach to unify comprehension and location of objects in an image. However, contour-based approaches of conventional systems further suffer from utilizing simple fusion techniques that do not account for both image and language features. As such, in some instances, conventional systems suffer from inaccurately identifying target objects in an image referred to by text (e.g., especially in zero-shot scenarios).

In addition to the inefficiency and inaccuracy issues, conventional systems further suffer from operational inflexibilities. For example, as mentioned, conventional systems typically require large-scale annotations. As such, conventional systems typically fail to train models on a wide variety of classes and further fail to scale the training of models on a large number of examples. Thus, conventional systems fail to adapt to zero-shot scenarios.

In one or more embodiments, the referring expression segmentation system provides several improvements over conventional systems in relation to efficiency, accuracy, and operational flexibility. For example, in some embodiments, the referring expression segmentation system improves upon computational efficiencies. In particular, the referring expression segmentation system does not require large-scale annotation of ground truth masks (e.g., in some instances, the referring expression segmentation system works with a training set containing only 10% annotations) for a training set.

For instance, the referring expression segmentation system generates inferred masks from digital images and digital text prompts, filters the inferred masks based on a validity threshold (e.g., utilizing the mask validity filtering), and utilizes the validly inferred masks to generate an augmented training set. In other words, the referring expression segmentation system modifies parameters of a model utilizing the augmented training set that contains mostly inferred masks. In some embodiments, the augmented training set eliminates the excessive user interactions and inefficiencies involved with obtaining a large number of annotations. Thus, the referring expression segmentation system improves the manner in training models to perform referring expression segmentation.

Further, in one or more embodiments the referring expression segmentation system improves upon computational accuracy. For example, the referring expression segmentation system utilizes a cross-attention layer of an image encoder to generate a cross-attention map from a digital image and a digital text prompt. Moreover, in some embodiments, the referring expression segmentation system compares the cross-attention map with a ground truth mask or an inferred mask from the augmented training set to determine a measure of loss. In some embodiments, the determined measure of loss helps localize the cross-attention map within a specific object indicated by the digital text prompt which enables the generation of higher quality masks. Thus, the referring expression segmentation system improves upon accuracy of conventional systems to segment an object in a digital image referred to by text by better localizing a cross-attention map within a target object and preventing collapse of the cross-attention map.

Additionally, in one or more embodiments, the referring expression segmentation system improves upon operational flexibility. For example, the referring expression segmentation system implements the weakly-supervised pipeline that uses a small number of annotations (e.g., 10%) to train a model to perform referring expression segmentation. In some embodiments, the referring expression segmentation system scales up to a large and diverse number of classes and thus trains models to accurately perform referring expression segmentation on zero-shot scenarios. Thus, in some embodiments, due to the efficiency and accuracy improvements, the referring expression segmentation system more flexibly generates segmentation masks for target objects in a digital image referred to by text.

Additional details regarding the referring expression segmentation system will now be provided with reference to the figures. For example, FIG. 1 illustrates a schematic diagram of an exemplary system environment 100 in which a referring expression segmentation system 102 operates. As illustrated in FIG. 1, the system environment 100 includes server(s) 104, a digital image editing system 106, a network 108, and a client device 116. Additionally, FIG. 1 illustrates that the digital image editing system 106 includes the referring expression segmentation system 102, which includes fused feature extractors 110, an attention mask consistency regularization model 112, and a mask validity filtering model 114. Moreover, the client device 116 includes a client application 118.

Although the system environment 100 of FIG. 1 is depicted as having a particular number of components, the system environment 100 is capable of having a different number of additional or alternative components (e.g., a different number of servers, client devices, or other components in communication with the referring expression segmentation system 102 via the network 108). Similarly, although FIG. 1 illustrates a particular arrangement of the server(s) 104, the network 108, and the client device 116, various additional arrangements are possible.

The server(s) 104, the network 108, and the client device 116 are communicatively coupled with each other either directly or indirectly (e.g., through the network 108 discussed in greater detail below in relation to FIG. 13). Moreover, the server(s) 104 and the client device 116 include one or more of a variety of computing devices (including one or more computing devices as discussed in greater detail in relation to FIG. 13).

As mentioned above, the system environment 100 includes the server(s) 104. In one or more embodiments, the server(s) 104 process input for training or at inference time generate a segmentation mask of a target object referred to by a digital text prompt. In one or more embodiments, the server(s) 104 comprise a data server. In some implementations, the server(s) 104 comprise a communication server or a web-hosting server.

In some embodiments, the client device 116 includes computing devices associated with the one or more user accounts that submit digital text prompts and digital images for the referring expression segmentation system 102 to generate a segmentation mask. For instance, the referring expression segmentation system 102 trains one or more models from training datasets provided from the client device 116 or a third-party source or generates segmentation masks utilizing the trained models.

In one or more embodiments, the client device 116 includes smartphones, tablets, desktop computers, laptop computers, head-mounted-display devices, or other electronic devices. The client device 116 includes one or more software applications (e.g., the client application 118 includes a digital image editing application) for generating or modifying digital content of a digital image in accordance with the digital image editing system 106. In one or more embodiments, the client application 118 includes a software application hosted on the server(s) 104 accessible by the client device 116 through another application, such as a web browser.

To provide an example implementation, in some embodiments, the referring expression segmentation system 102 on the server(s) 104 supports the referring expression segmentation system 102 on the client device 116. For instance, the referring expression segmentation system 102, via the server(s) 104, provides information/software to the client device 116. Specifically, the client device 116 obtains (e.g., downloads) the referring expression segmentation system 102 from the server(s) 104. Once downloaded, the referring expression segmentation system 102 on the client device 116 provides tools for segmenting target objects in digital images referred to by text.

In alternative implementations, the referring expression segmentation system 102 includes a web hosting application that allows the client device 116 to interact with content and services hosted on the server(s) 104. To illustrate, in one or more implementations, the client device 116 access a software application supported by the server(s) 104. In response, the referring expression segmentation system 102 on the server(s) 104 provides tools for segmenting target objects in a digital image referred to by text.

Indeed, in some embodiments, the referring expression segmentation system 102 is implemented in whole, or in part, by the individual elements of the system environment 100. For instance, although FIG. 1 illustrates the referring expression segmentation system 102 implemented or hosted on the server(s) 104, different components of the referring expression segmentation system 102 are able to be implemented by a variety of devices within the system environment 100. For example, one or more (or all) components of the referring expression segmentation system 102 are implemented by a different computing device or a separate server from the server(s) 104. Indeed, as shown in FIG. 1, the client device 116 includes the referring expression segmentation system 102. Example components of the referring expression segmentation system 102 will be described below with regard to FIG. 9.

Figure 2A:
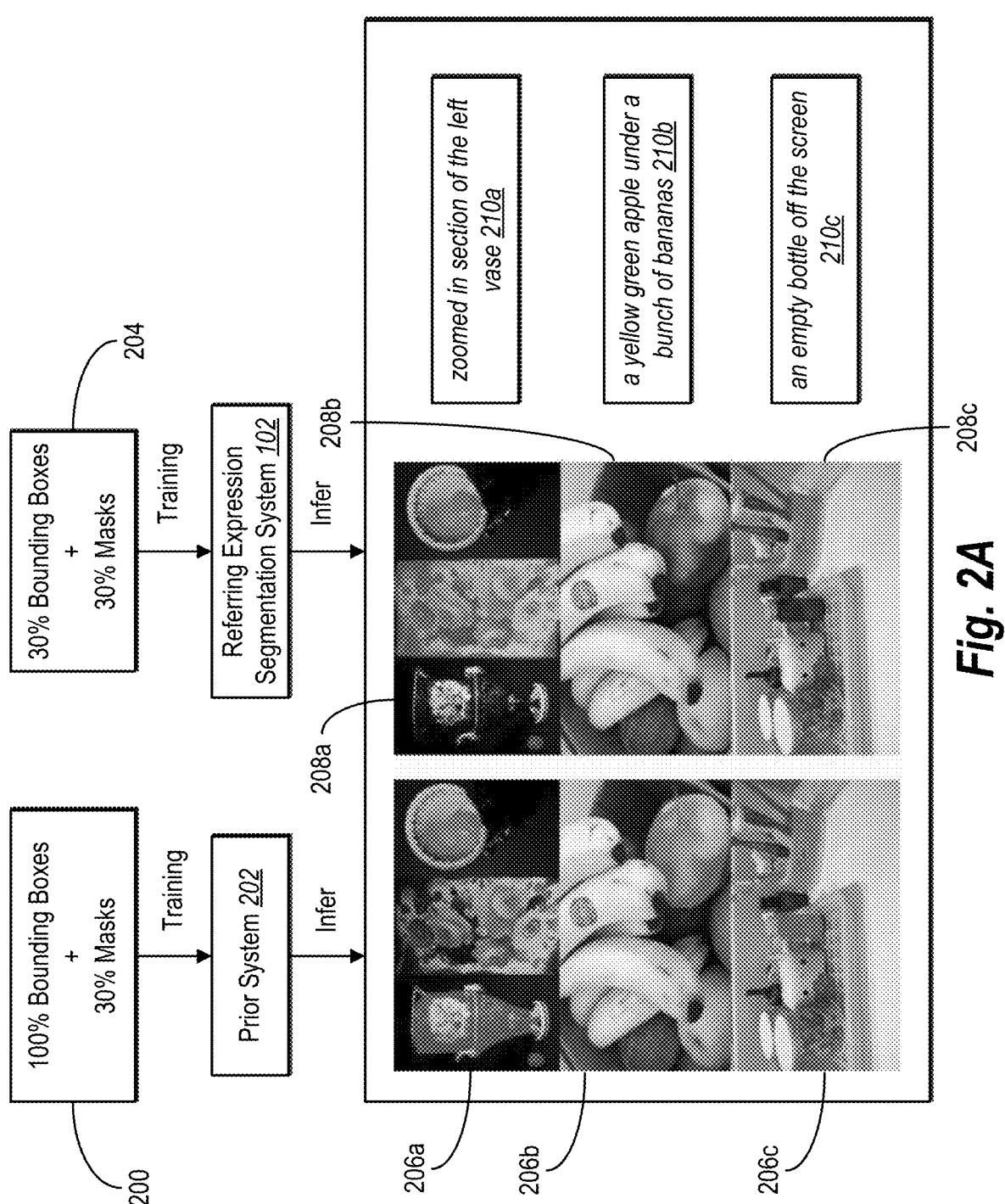
FIG. 2A illustrates an overview of the referring expression segmentation system segmenting one or more target objects compared to a prior system segmenting one or more target objects in accordance with one or more implementations.

As mentioned above, in certain embodiments, the referring expression segmentation system 102 segments a target object referred to by a digital text prompt. FIG. 2A illustrates an overview of the referring expression segmentation system 102 segmenting a target object with a model trained on a small number of annotations (e.g., 30%) compared to prior systems trained on a higher number of annotations (100% bounding box annotations). In particular, FIG. 2A illustrates that the referring expression segmentation system 102 accurately generates a segmentation mask for target objects in digital images referred to by digital text prompts in accordance with one or more embodiments.

As shown in FIG. 2A, a prior system 202 trains one or more models with a training set 200 that contains a large number of annotations. Specifically, the prior system 202 trains the one or more models with the training set 200 that contains 100% bounding box annotations and 30% mask annotations. In contrast, the referring expression segmentation system 102 trains one or more models with a training set 204 that contains 30% bounding box annotations and 30% mask annotations.

As further shown in FIG. 2A, the prior system 202 and the referring expression segmentation system 102 segments objects within a digital image referred to by digital text prompts. Specifically, FIG. 2A shows the prior system 202 segmenting target objects in a digital image 206*a*, a digital image 206*b*, and a digital image 206*c*. Further, FIG. 2A shows the referring expression segmentation system 102 segmenting target objects in a digital image 208*a*, a digital image 208*b*, and a digital image 208*c*. For example, the prior system 202 and the referring expression segmentation system 102 segments the target objects referred to in a digital text prompt 210*a* ("zoomed in section of the left vase), a digital text prompt 210*b* ("a yellow green apple under a bunch of bananas), and a digital text prompt 210*c* ("an empty bottle off the screen).

To illustrate, for the digital text prompt 210*b*, the referring expression segmentation system 102 accurately segments the "yellow-green" apple under the bananas, while the prior system 202 inaccurately segments the "red-green" apple. Further, for the digital text prompt 210*c*, the referring expression segmentation system 102 accurately segments the "empty bottle" that is partially off the screen while the prior system 202 inaccurately segments a bottle completely within the screen.

As shown in FIG. 2A, unlike prior systems, the referring expression segmentation system 102 does not train on fully-supervised referring expression comprehensions tasks (e.g., understanding the context of a digital image). Specifically, the referring expression segmentation system 102 with just 30% annotations (e.g., for both masks and bounding boxes) achieves a significant improvement of accurately segmenting a target object as compared to the prior system 202. For example, in measuring a mean intersection over union (e.g., an intersection over union (IoU) indicates an overlap of a prediction and a ground truth indicator, and a mean intersection over union (mIoU) calculates the average intersection over union across all classes or instances), the referring expression segmentation system 102 (e.g., with just 30% annotations) achieves a 59.31 mIoU. In contrast, the prior system 202 for fully supervised training (e.g., 100% annotations) achieved an mIoU of 59.93 and for partially supervised training (100% bounding box annotations and 30% mask annotations) achieves an mIoU of 57.85. Of note, a higher mIoU indicates better segmentation accuracy, while a lower mIoU suggests poorer performance.

Figure 2B:
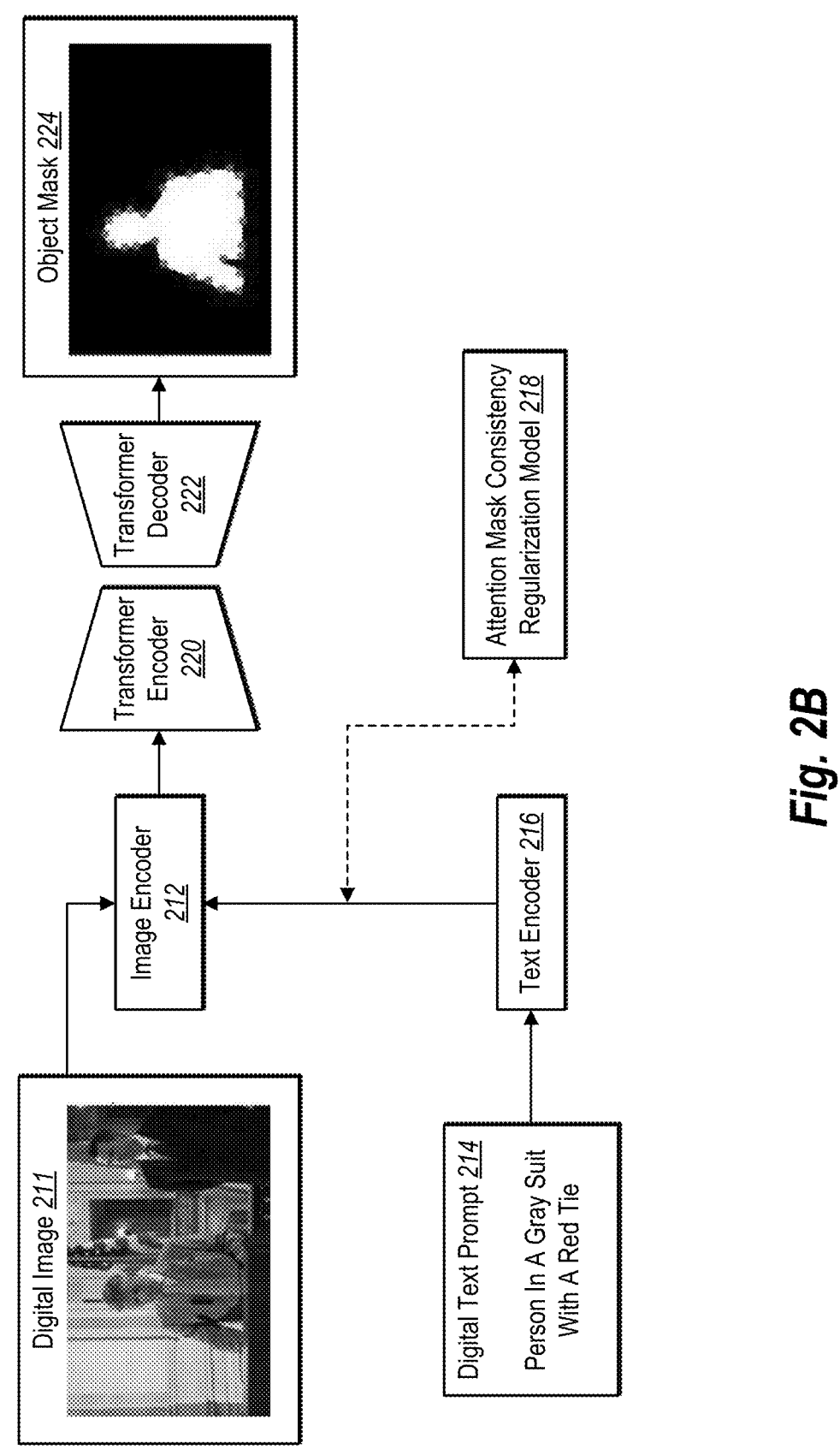
FIG. 2B illustrates an overview of the referring expression segmentation system segmenting a target object referred to be a digital text prompt in accordance with one or more implementations.

As mentioned above, in certain embodiments, the referring expression segmentation system 102 generates an object mask from a digital image and a digital text prompt that refers to an object within the digital image. FIG. 2B illustrates an overview of the referring expression segmentation system 102 generating an object mask utilizing an image-text encoder pair and a encoder-decoder transformer pair in accordance with one or more embodiments.

As shown in FIG. 2B, the referring expression segmentation system 102 receives a digital image 211. Specifically, the digital image 211 includes a digital frame composed of various pictorial elements. For example, the pictorial elements include pixel values that define the spatial and visual aspects of the digital image 211. For instance, the digital image 211 includes a plurality of individual pixels that depict one or more object(s). In some embodiments, the referring expression segmentation system 102 receives the digital image 211 from various image editing platforms. In some instances, the referring expression segmentation system 102 captures the digital image 211 by utilizing a digital capture application.

As mentioned, the digital image 211 depicts one or more objects. For example, an object includes a collection of pixels in a digital image that depicts a person, place, text, or thing. To illustrate, in some embodiments, an object includes a person, an item, a natural object (e.g., a tree or rock formation) or a structure depicted in the digital image 211. For instance, an object includes text that depicts a word or a series of words. In some instances, an object refers to a plurality of elements that, collectively, are distinguished from other elements depicted in a digital image. For example, an object includes a collection of buildings that make up a skyline. In some instances, an object more broadly includes a (portion of a) foreground or other element(s) depicted in a digital image as distinguished from a background.

As shown in FIG. 2B, the referring expression segmentation system 102 receives a digital text prompt 214 that states "person in a gray suit with a red tie." In particular, the digital text prompt 214 includes multiple concepts and also contains a referring expression. For example, the digital text prompt 214 contains the word "person" "gray suit" and "red tie." Further, the digital text prompt 214 refers to a person, however the digital image 211 shows two persons. However, the digital text prompt 214 contains the referring expression of "gray suit with a red tie" to indicate the person on the left. Thus, the digital text prompt 214 contains a string of words and concepts that refer to one or more objects within the digital image 211.

In one or more embodiments, a neural network includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

As shown in FIG. 2B, the referring expression segmentation system 102 utilizes an image encoder 212. In one or more embodiments, the image encoder 212 is a neural network (or one or more layers of a neural network) that extract features relating to digital images, e.g., in this instance relating to localized features of the digital image. In some cases, the image encoder 212 refers to a neural network that both extracts and encodes features from the digital image 211. For example, the image encoder 212 includes a particular number of layers including one or more fully connected and/or partially connected layers of neurons that extract image patches from the digital image 211 and encode localized features of the digital image 211. To illustrate, in one or more embodiments, the referring expression segmentation system 102 generates an image encoding that represents the digital image 211 by utilizing the image encoder 212.

As shown in FIG. 2B, the referring expression segmentation system 102 also utilizes a text encoder 216. In one or more embodiments, the referring expression segmentation system 102 utilizes the text encoder 216 to process the digital text prompt 214. In particular, the text encoder 216 includes a component of a neural network to transform textual data (e.g., the text query) into a numerical representation. For instance, the referring expression segmentation system 102 utilizes the text encoder 216 to transform the digital text prompt 214 into a text encoding.

Further, the referring expression segmentation system 102 utilizes the text encoder 216 in a variety of ways. For instance, the referring expression segmentation system 102 utilizes the text encoder 216 to i) determine the frequency of individual words in the digital text prompt 214 (e.g., each word becomes a feature vector), ii) determines a weight for each word within the digital text prompt 214 to generate a text vector that captures the importance of words within a text prompt, iii) generates low-dimensional text vectors in a continuous vector space that represents words within the digital text prompt 214, and/or iv) generates contextualized text vectors by determining semantic relationships between words within the digital text prompt 214.

As shown in FIG. 2B, in addition to the image-text encoder pair, the referring expression segmentation system 102 utilizes an attention mask consistency regularization model 218. Specifically, the referring expression segmentation system 102 utilizes the attention mask consistency regularization model 218 to fully localize a cross-attention map within a target object, which enhances the spatial localization of the target object. Additional details of the attention mask consistency regularization model 218 is given below in the description of FIG. 5A.

As shown in FIG. 2B, the referring expression segmentation system 102 further utilizes a transformer model to generate an object mask 224. In one or more embodiments, a transformer model includes a transformer encoder and transformer decoder pair. For example, a transformer encoder 220 processes input sequences such as the combined encoding generated by the referring expression segmentation system 102 utilizing the image-text encoder pair (e.g., a fused feature extractor). For instance, the referring expression segmentation system 102 utilizes the transformer encoder 220 to generate a context-aware encoding (e.g., an encoding that considers surrounding context or importance of the various elements in a digital image or digital text prompt). In some embodiments, the transformer encoder 220 utilizes self-attention mechanisms to attend to other elements. In some embodiments, a transformer decoder 222 takes the context-aware encodings from the transformer encoder and generates an output such as the object mask 224. In some embodiments, the transformer decoder 222 utilizes cross-attention mechanisms to attend to the transformer encoder's output.

As shown, in FIG. 2B, the referring expression segmentation system 102 generates a digital image with the object mask 224 that segments a target object referred to by the digital text prompt 214. Specifically, the object mask 224 segments the person in "a gray suit with a red tie." For example, the referring expression segmentation system 102 generates the object mask 224 by utilizing a fused feature extractor and a transformer model to identify pixels corresponding to an indicated region by the digital text prompt 214.

Figure 3:
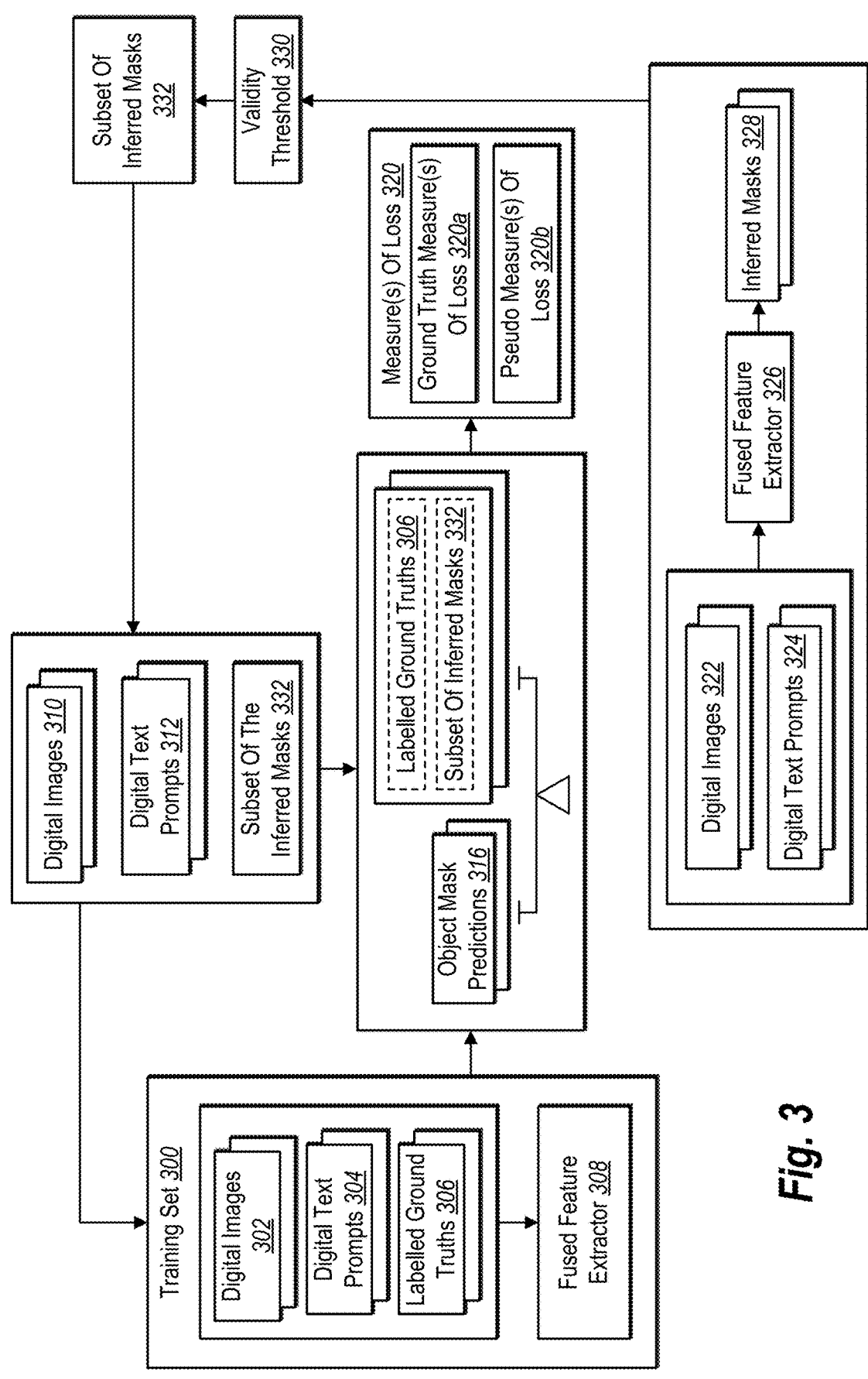
FIG. 3 illustrates a diagram of the referring expression segmentation system utilizing a weakly-supervised training pipeline in accordance with one or more implementations.

As mentioned above, in certain embodiments, the referring expression segmentation system 102 implements a weakly-supervised bootstrapping pipeline. FIG. 3 illustrates the referring expression segmentation system 102 determining measure(s) of loss to train one or more models in accordance with one or more embodiments. Specifically, FIG. 3 illustrates a training set and the referring expression segmentation system 102 further augmenting the training set with inferred masks. For example, the referring expression segmentation system 102 utilizes a training set 300 that does not contain box annotations for the full dataset (e.g., the training set 300 only contains some ground truth masks).

As shown, FIG. 3 illustrates the referring expression segmentation system 102 utilizing a fused feature extractor 308 for initial (referring expression segmentation) training, which trains one or more models with ground truth masks (e.g., labelled mask data that includes mask annotations or bounding box annotations, in some embodiments, the number of bounding box annotations is equal to the number of mask annotations). Specifically, the initial training prepares the one or more models to generate inferred masks 328 (e.g., pseudo labels). For example, the referring expression segmentation system 102 utilizes the training set 300 which contains digital images 302, digital text prompts 304 and labeled ground truths 306 to perform the initial training and later uses digital images 322 and digital text prompts 324 to generate the inferred masks 328.

As mentioned, the referring expression segmentation system 102 utilizes the training set 300 that contains the labeled ground truths 306 for the initial training of one or more models. Specifically, the labeled ground truths 306 include an annotation within a digital image (e.g., the annotation delineates one or more objects). For example, the labeled ground truths 306 contain mask annotations (e.g., ground truth masks or segmentation maps) or bounding box annotations (e.g., that delineate a rectangular region used to enclose or encompass an object or a specific area in the digital images 302).

As an example, the training set 300 includes training triplets (e.g., digital images 302, digital text prompts 304, and labeled ground truths 306). In some embodiments, the training set 300 also includes training doublets (e.g., digital images 322, and digital text prompts 324 without any corresponding ground truth annotations). As mentioned, the referring expression segmentation system 102 initially utilizes the training triplets of the training set 300 to generate object mask predictions 316.

As shown, the referring expression segmentation system 102 utilizes the fused feature extractor 308, which includes a cross-modality fusion between language and vision. For example, the fused feature extractor 308 includes an image encoder and a text encoder that learns high-quality language aware visual representations. In other words, the cross-modality nature of the fused feature extractor 308 allows the referring expression segmentation system 102 to unify text and digital image properties when generating one or more encodings. For instance, the referring expression segmentation system 102 utilizes the fused feature extractor 308 that includes a normalized gated cross-attention mechanism (e.g., the referring expression segmentation system 102 scales and controls the flow of information through the fused feature extractor by using various attention mechanisms to focus on specific parts of an input).

As shown in FIG. 3, the referring expression segmentation system 102 utilizes pseudo-labelling to run inference on remaining training pairs (e.g., the training doublets) without labeled ground truths (e.g., ground truth masks or bounding box annotations) utilizing the one or more models trained on the training triplets. As part of the pseudo-labelling, the referring expression segmentation system 102 utilizes mask validity filtering to verify the validity of the inferred masks in a zero-shot fashion.

In one or more embodiments, the referring expression segmentation system 102 utilizes a fused feature extractor 326 to generate the inferred masks 328 from the training doublets (e.g., in some instances, the fused feature extractor 326 is the fused feature extractor 308 that underwent an initial round of training from the training triplets). Specifically, the referring expression segmentation system 102 generates the inferred masks 328 from digital images 322 and digital text prompts 324. For example, an inferred mask includes an object mask for an object within a digital image as indicated by a digital text prompt. Further, the inferred mask more specifically refers to a mask that the referring expression segmentation system 102 generates but does not contain a corresponding labeled ground truth (e.g., ground truth mask or bounding box annotation).

As shown, the referring expression segmentation system 102 utilizes a validity threshold 330 to filter the inferred masks 328 based on one or more of the inferred masks 328 validly delineating an object within the digital images 322. Specifically, the validity threshold 330 includes the referring expression segmentation system 102 comparing the inferred masks 328 to a corresponding digital image (e.g., a digital image used to generate the inferred mask). For example, the referring expression segmentation system 102 determines whether an inferred mask satisfies a threshold of matching a location of an identified object within a corresponding digital image. Additional details regarding the validity threshold 330 is given below in the description of FIG. 4.

As shown, the referring expression segmentation system 102 utilizes the validity threshold 330 to identify a subset of inferred masks 332 from the inferred masks 328 and adds the subset of inferred masks 332 to the training set 300. Specifically, the referring expression segmentation system 102 adds the subset of inferred masks 332 to the training set 300 to generate an augmented training set. For example, the referring expression segmentation system 102 combines the subset of inferred masks 332 with corresponding training doublets (e.g., digital images 310 and digital text prompts 312 that are a subset from the digital images 322 and the digital text prompts 324) used to generate the subset of inferred masks 332. As such, the augmented training set includes training triplets with the labeled ground truths 306 and training triplets with the subset of inferred masks 332.

In one or more embodiments, the referring expression segmentation system 102 performs a semi-supervised retraining of the one or more models with the augmented training set. As shown, the referring expression segmentation system 102 generates the object mask predictions 316 from the training triplets of the augmented training set containing both the labeled ground truths 306 and the subset of inferred masks 332. In some embodiments, the referring expression segmentation system 102 generates an object mask prediction from a digital image and digital text prompt that contains a corresponding ground truth mask. In some embodiments, the referring expression segmentation system 102 generates the object mask prediction from a digital image and digital text prompt that contains a corresponding inferred mask.

As shown in FIG. 3, the referring expression segmentation system 102 compares either the labeled ground truths 306 or the subset of inferred masks 332 to the object mask predictions 316. Specifically, FIG. 3 shows the referring expression segmentation system 102 determining measure(s) of loss 320 based on comparing the labeled ground truths 306 or the subset of inferred masks 332 with the object mask predictions 316. For example, the measure (s) of loss 320 include ground truth measure(s) of loss 320$a$ and pseudo measure(s) of loss 320$b$.

Determining the ground truth measure(s) of loss 320$a$ include the referring expression segmentation system 102 generating an object mask prediction and comparing the object mask prediction to a labeled ground truth. Specifically, the referring expression segmentation system 102 modifies parameters of the fused feature extractor and the transformer model based on the ground truth measure(s) of loss 320$a$.

Determining the pseudo measure(s) of loss 320$b$ includes the referring expression segmentation system 102 generating an object mask prediction and comparing the object mask prediction to an inferred mask. Specifically, the referring expression segmentation system 102 modifies parameters of the fused feature extractor and the transformer model based on the pseudo measure(s) of loss 320$b$.

As just mentioned, the referring expression segmentation system 102 modifies parameters based on the measure(s) of loss 320. Specifically, the referring expression segmentation system 102 utilizes the measure(s) of loss 320 as a semi-supervised loss (e.g., semi-supervised because part of the loss depends on a ground truth and part of the loss depends on the pseudo loss) and further utilizes a weighting parameter. For example, the referring expression segmentation system 102 represents the semi-supervised loss as:

$$\mathcal{L}_{semi} = \underbrace{\mathcal{L}_{total}^{GT}}_{Loss\ with\ GT\ Masks} + \gamma \cdot \underbrace{\mathcal{L}_{total}^{Pseudo}}_{Loss\ with\ Pseudo-Masks}$$

For instance, loss with ground truth represents the ground truth measure(s) of loss 320$a$, and loss with pseudo represents the pseudo measure(s) of loss 320$b$. Moreover, the referring expression segmentation system 102 utilizes gamma ($\gamma$) to balance the amount of the labeled ground truths 306 against the amount of the subset of inferred masks 332. Specifically, the referring expression segmentation system 102 introduces a gamma scheduling strategy to systematically change the value of gamma over a set of iterations (e.g., to improve the generalization performance of the fused feature extractors by dynamically adapting the influence of individual training examples as training progresses). For example, the referring expression segmentation system 102 sets an initial minimum gamma value of 0.9 and a maximum gamma value of 1.0. In other words, referring expression segmentation system 102 places more weight to the subset of inferred masks 332 as training progresses.

In one or more embodiments, the referring expression segmentation system 102 utilizes the gamma scheduling strategy to assign a first weight to the subset of the inferred masks 332 that is greater than a second weight assigned to the labeled ground truths 306 (e.g., the ground truth masks). In other words, the referring expression segmentation system 102 favors the subset of inferred masks 332 more than the labeled ground truths 306. Specifically, the referring expression segmentation system 102 modifies parameters of the fused feature extractors (e.g., fused feature extractor 308 or 326) according to the first weight and the second weight assigned to the subset of inferred masks 332 and the labeled ground truths 306.

Moreover, the following algorithm provides additional details of the referring expression segmentation system 102 utilizing the gamma scheduling strategy:

---

Algorithm 1 WS with $\gamma$-scheduling

---

Require: GT data $\mathcal{D}^{GT}$ : {I, T, M}

Remaining Unlabeled data $\mathcal{D}_{rem}^{GT}$ : $\{I_{rem}, T_{rem}\}$

Mask Validity Filtering : MVF
  Total Scheduling Steps: $\mathcal{S}$
  $\gamma_0 = 0.9$ MODEL Encoder: $\mathcal{F}_\theta^0$ $\mathcal{L}_{total} \leftarrow \mathcal{F}_\theta^0(I, T, M)$ while $s \leq \mathcal{S}$ do $\hat{M} \leftarrow MVF\big(\mathcal{F}_\theta^0(I_{rem}, T_{rem})\big)$ $\{I', T', M'\} \leftarrow \{I, T, M\} + \{\hat{I}, \hat{T}, \hat{M}\}$ $\mathcal{L}_{semi} \leftarrow \mathcal{F}_\theta^0(I', T', M')$ $\gamma_{s+1} \leftarrow \gamma_s + 0.1/\mathcal{S}$
    $s \leftarrow s + 1$
  end while

---

In other words, the algorithm utilizes the ground truth data (e.g., the labeled ground truths 306), the unlabeled data (e.g., no corresponding ground truths), mask validity filtering, total scheduling steps, and a gamma parameter. Further, the first step involves determining a total measure of loss for the ground truth data, the second step involves utilizing mask validity filtering to filter valid pseudo masks (e.g., the subset of inferred masks 332), and the third step involves determining a semi-supervised measure of loss from both the ground truth data and the unlabeled data.

As mentioned, FIG. 3 illustrates a weakly-supervised bootstrapping pipeline for training one or more models (e.g., the fused feature extractors and/or transformer models). Although the description of FIG. 3 describes a particular order, in some embodiments, the referring expression segmentation system 102 trains one or more models by first generating the inferred masks 328, filtering the inferred masks 328, generating an augmented training set, and further inferring the object mask predictions 316 after generating the augmented training set.

In one or more embodiments, the referring expression segmentation system 102 performs multiple iterations of running through the pipeline described in FIG. 3. Specifically, the referring expression segmentation system 102 initially generates inferred masks for a subset of the training doublets (e.g., the doublets not containing a ground truth annotation), filters the inferred masks to identify the subset of inferred masks 332, and adds the subset of inferred masks 332 to the training set 300. For example, the referring expression segmentation system 102 modifies parameters of one or more models based on a determined measure of loss and then repeats the process for another subset of the training doublets.

In other words, the referring expression segmentation system 102 performs numerous iterations of running through the weakly-supervised bootstrapping pipeline shown in FIG. 3. Specifically, with each increase in the number of runs, the referring expression segmentation system 102 trains the models to be more confident and generate object mask predictions with significant qualitative improvements.

Figure 4:
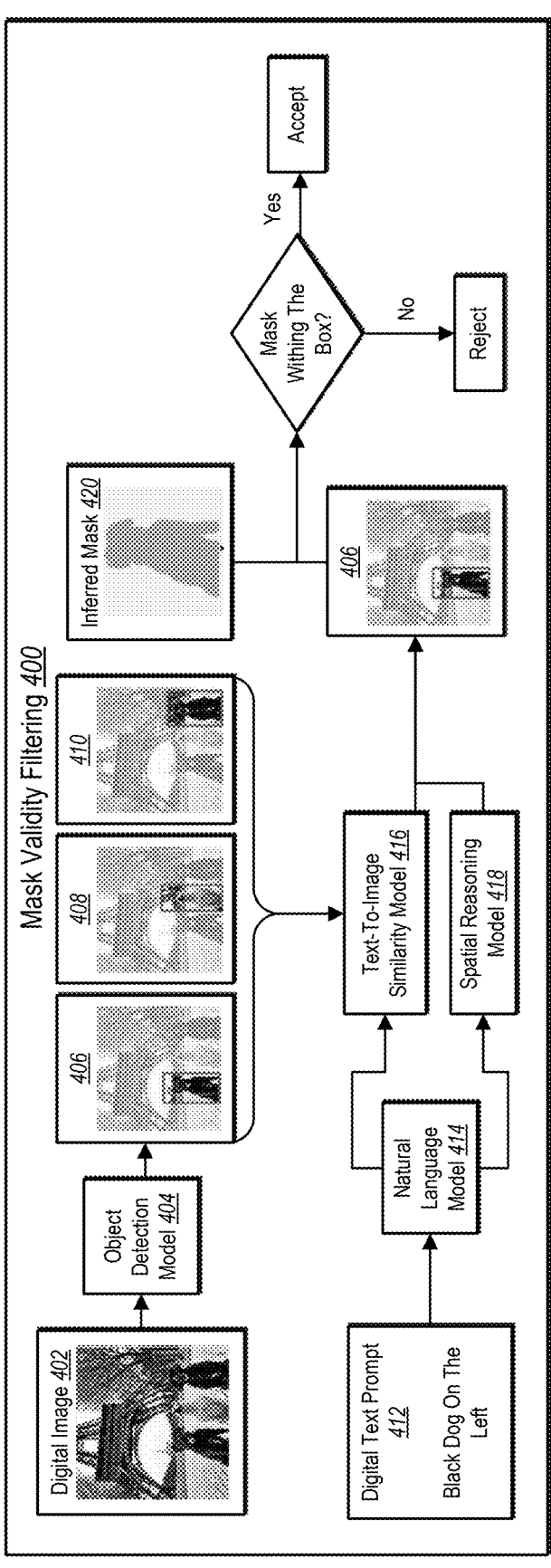
FIG. 4 illustrates a diagram of the referring expression segmentation system utilizing mask validity filtering in accordance with one or more implementations.

As mentioned above, the referring expression segmentation system 102 utilizes mask validity filtering to identify a subset of the inferred masks. FIG. 4 shows an example diagram of the referring expression segmentation system 102 utilizing the mask validity filtering 400 as part of the weakly-supervised pipeline to validate an inferred mask in accordance with one or more embodiments. Specifically, FIG. 4 shows the referring expression segmentation system 102 utilizing the mask validity filtering 400, which is the process of identifying inferred masks as localizing a target object in a digital image being referred to in a digital text prompt. For example, the referring expression segmentation system 102 utilizes the mask validity filtering 400 as a zero-shot referring expression comprehension task. In other words, the mask validity filtering 400 helps the referring expression segmentation system 102 in situations where a model has not seen a specific example (e.g., to comprehend the context of an object in a digital image relative to other objects in the digital image).

FIG. 4 shows the mask validity filtering 400 as composed of two parts i) bounding box generation using zero-shot referring expression comprehension and ii) validating the inferred masks using the obtained bounding boxes. Specifically, FIG. 4 shows the referring expression segmentation system 102 utilizing an object detection model 404 to detect objects in a digital image 402. For example, FIG. 4 shows the referring expression segmentation system 102 utilizing the object detection model 404 to generate a first object proposal 406, a second object proposal 408, and a third object proposal 410. For instance, each of the object proposals 406-410 delineate a region containing a different object (e.g., a dog) in the digital image 402.

To illustrate, in one or more embodiments, the referring expression segmentation system 102 utilizes the object detection model 404 one of the machine learning models or neural networks described in U.S. patent application Ser. No. 17/589,114, "Detecting Digital Objects And Generating Object Masks On Device," filed on Jan. 31, 2022, U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., *Faster r-cnn: Towards real-time object detection with region proposal networks*, NIPS, 2015; or Redmon, et al., *You Only Look Once: Unified, Real-Time Object Detection*, CVPR 2016, the contents of each of the foregoing patent applications and papers are hereby incorporated by reference in their entirety.

As also shown, the referring expression segmentation system 102 processes a digital text prompt 412 that reads "black dog on the left" using a natural language model 414. Specifically, the referring expression segmentation system 102 utilizes the natural language model 414 to tokenize text within the digital text prompt 412, assign grammatical categories to text in the digital text prompt 412, identify relationships between words (e.g., a spatial reference), and simplify the digital text prompt 412. In particular, a natural language model 414 refers to a computer algorithm that analyzes text (e.g., a word or a grouping of words, such as a text phrase) and generates one or more corresponding embeddings in an embedding space. For example, a natural language model 414, in one or more implementations, includes algorithms, such as the Global Vectors for Word Representation (GloVe) model or the Embeddings from Language Model (ELMo) model. In one or more implementations, the natural language model 414 is a transformer-based model, such as the Bidirectional Encoder Representations from Transformers (BERT) model. In one or more embodiments, the natural language model 414 comprises sentence transformers as described by Reiners et al. in Sentence-BERT: Sentence Embeddings using Siamese BERT-Networks, 2019 Conference on Empirical Methods in Natural Language Processing, available at https://arxiv.org/pdf/1908.10084.pdf, (2019), the entire content of which is hereby incorporated by reference in its entirety. Alternatively, the natural language model 414 comprises sentence transformers as described by Jacob Devlin et al., *BERT: Pre-training of Deep Bidirectional Transformers for Language Understanding*, 2018, https://arxiv.org/abs/1810.04805, which is incorporated herein by reference in its entirety. In still further embodiments, the language embedding model 314 comprises sentence transformers described by SimCSE-BERT$_{base}$ and/or SimCSE-ROBERTa$_{large}$ as described by Gao et al. in SimCSE: Simple Contrastive Learning of Sentence Embeddings, In Proceedings of the 2021 Conference on Empirical Methods in Natural Language Processing, pages 6894-6910, Online and Punta Cana, Dominican Republic. Association for Computational Linguistics, 2021, which is incorporated herein by reference in its entirety. In still further implementations, the natural language model 414 comprises the model as described by Honnibal et al. in spaCy 2: Natural Language Understanding With Bloom Embed-Dings, Convolutional Neural Networks And Incremental Parsing, 2017.

As further shown, the referring expression segmentation system 102 utilizes a text-to-image similarity model 416 to generate score proposals based on the digital text prompt 412 and the object proposals 406-410. In one or more embodiments, the referring expression segmentation system 102 implements the text-to-image similarity model 416 in the form of the model described by Goel et al. in CYCLIP: Cyclic Contrastive Language-Image Pretraining, 36th Conference on Neural Information Processing Systems (NeurIPS 2022), which is incorporated by reference herein in its entirety. Alternatively, the referring expression segmentation system 102 implements the model described by Gu et al. in Unified Pretraining Framework for Document Understanding, 35th Conference on Neural Information Processing Systems (NeurIPS 2021), which is incorporated by reference herein in its entirety. In still further implementations, the referring expression segmentation system 102 implements the model described by Chuang et al. in DiffCSE: Difference-based contrastive learning for sentence embeddings, In Proceedings of the 2022 Conference of the North American Chapter of the Association for Computational Linguistics: Human Language Technologies, pages 4207-4218, Seattle, United States. Association for Computational Linguistics, which is incorporated by reference herein in its entirety, or another model. In still further implementations, the referring expression segmentation system 102 implements the model described by Radford et al. in *Learning Transferable Visual Models from Natural Lan-*

*guage Supervision*, https://arxiv.org/abs/2103.00020, Feb. 26, 2021, which is fully incorporated by reference herein.

The referring expression segmentation system 102 utilizes the text-to-image similarity model 416 to generate a similarity score between a digital image and a digital text prompt by utilizing a shared representation space for the language and visual modalities. For instance, the text-to-image similarity score generated by the referring expression segmentation system 102 indicates the similarity of one or more objects in a digital image to a digital text prompt (e.g., the higher the text-to-image similarity score the more similar the text and one or more objects in the digital image).

As a further example, the referring expression segmentation system 102 generates the similarity score between the object proposals 406-410 and the digital text prompt 412 by employing a Gaussian blur on the background of the digital image 402 and by adding a colored (e.g., red) box of uniform thickness to surround the object proposals 406-410. Specifically, the referring expression segmentation system 102 passes each of the colored boxes of uniform thickness surrounding the object proposal and the digital text prompt 412 to the text-to-image similarity model 416 (e.g., to obtain the text-to-image similarity score).

Notably, the text-to-image similarity scores do not consider the spatial understanding of the objects in the different bounding boxes and would generate high text-to-image similarity scores for two of the dogs in the digital image 402. Specifically, the referring expression segmentation system 102 utilizes spatial references in the digital text prompt 412 to identify an object in the digital image. For example, a spatial reference includes a language or textual cue that provides information about a spatial location or arrangement of one or more objects within a digital image. In some embodiments, the spatial reference implicitly describes an object's position, orientation, or relationship between elements, while in some embodiments the spatial reference explicitly describes those spatial properties.

As an example, the referring expression segmentation system 102 incorporates a model to inject spatial understanding and overcome the limitations of just using the text-to-image similarity model 416. Specifically, the referring expression segmentation system 102 utilizes a spatial reasoning model 418 that divides the digital text prompt 412 into noun chunks and their spatial relations (e.g., right/east, left/west, smaller/tinier/further, biggest/larger/closer, between, within/inside, above/north/top, below/under/south, back/behind, and front) with each other. For example, the digital text prompt 412 reads "black dog on the left" and the referring expression segmentation system 102 utilizes the spatial reasoning model 418 to connect "black dog" to the spatial location of "left." Alternatively, if the digital text prompt 412 does not contain a relation, the referring expression segmentation system 102 relies on the text-to-image similarity scores.

In continuing with the referring expression segmentation system 102 utilizing the spatial reasoning model 418, the referring expression segmentation system 102 utilizes the relation ("left") to score each of the object proposals 406-410. Specifically, the referring expression segmentation system 102 identifies a centroid of coordinates of the colored boxes of uniform thickness surrounding the object proposals 406-410. For example, the referring expression segmentation system 102 utilizes the centroid to determine which colored box in the digital image 402 is "left" relative to another colored box (e.g., in additional examples, the referring expression segmentation system 102 compares the centroid coordinate of the colored box with other spatial references such as top, east, west, etc.).

As shown in FIG. 4, the referring expression segmentation system 102 then validates an inferred mask 420 with the object proposal 406 identified from the text-to-image similarity score and the spatial reasoning model 418. Specifically, the referring expression segmentation system 102 determines whether the inferred mask 420 lies (e.g., matches a location) within the colored box of the object proposal 406. In other words, the referring expression segmentation system 102 compares the inferred mask 420 with the colored box of the object proposal 406. For example, when the inferred mask 420 lies within the colored box, the referring expression segmentation system 102 accepts the inferred mask 420 as part of the augmented training set and when the inferred mask 420 fails to lie within the colored box, the referring expression segmentation system 102 rejects the inferred mask 420 as being part of the augmented training set.

In one or more embodiments, when the referring expression segmentation system 102 determines to accept the inferred mask 420, the referring expression segmentation system 102 samples contour points. Specifically, the referring expression segmentation system 102 samples the contour points (e.g., the boundary outline) of the inferred mask 420 and adds the sampled contour points to the augmented training set.

As a further example, to validate the inferred mask 420, the referring expression segmentation system 102 generates a bounding box from the outermost points (top-most, bottom-most, right-most, and left-most) of the inferred mask 420. Specifically, the referring expression segmentation system 102 compares the bounding box of the inferred mask with the colored box of the object proposal 406 and calculates a similarity coefficient. For example, the referring expression segmentation system 102 calculates a dice similarity coefficient (DSC). In some instances, the referring expression segmentation system 102 rejects inferred masks with a DSC value of less than 0.1.

Figure 5A:
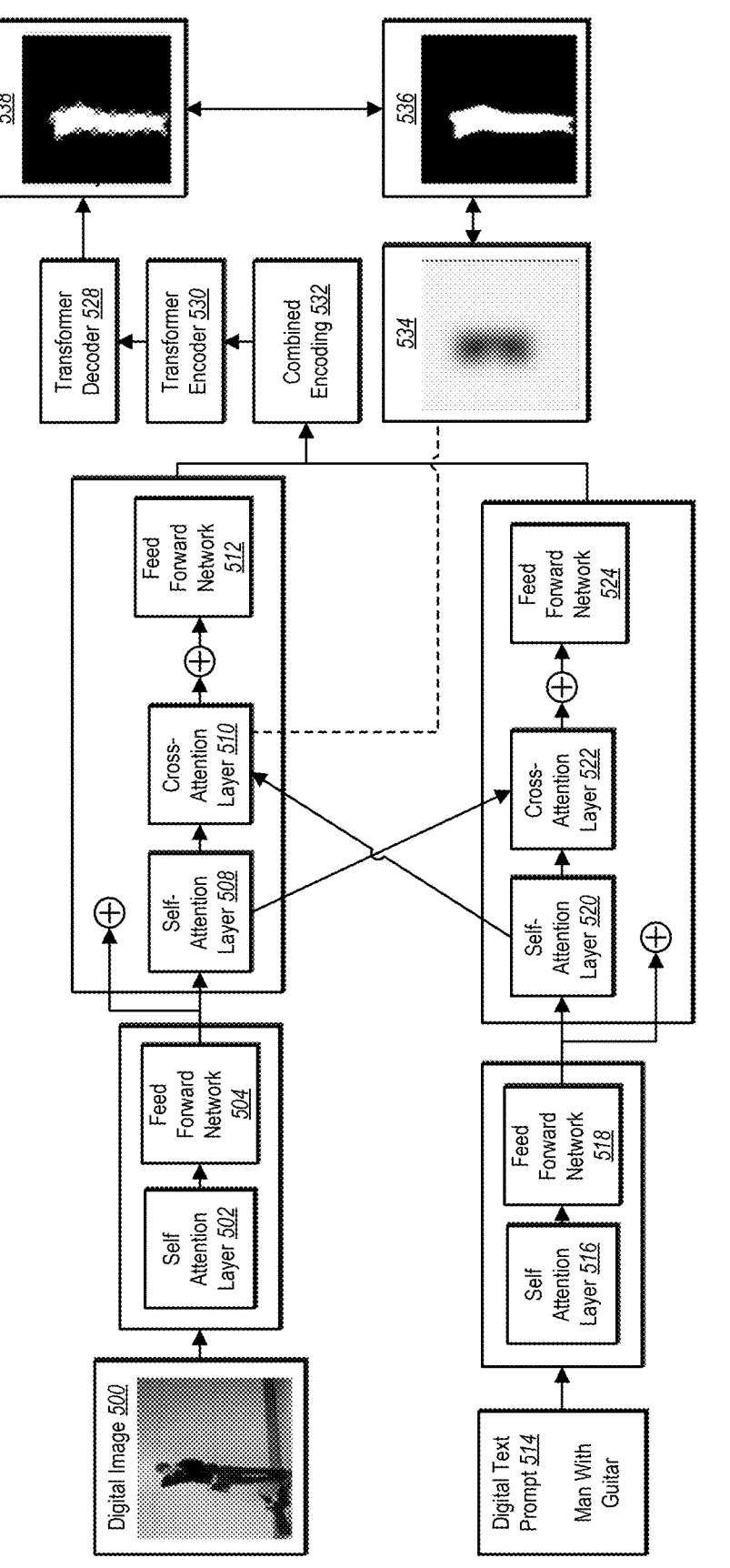
FIGS. 5A-5B illustrates diagrams of the architectural components of the referring expression segmentation system in accordance with one or more implementations.

As mentioned above, the referring expression segmentation system 102 utilizes novel architectural components to generate an object mask for a target object referred to by text. For example, FIG. 5A illustrates an example diagram of the referring expression segmentation system 102 utilizing the architectural components to determine a measure of loss and modify parameters of one or more models. Specifically, the referring expression segmentation system 102 modifies parameters of the fused feature extractor and the transformer model.

FIG. 5A shows the referring expression segmentation system 102 receiving a digital image 500 and utilizing the digital image 500 as input into an image encoder. Specifically, the referring expression segmentation system 102 feed as input the digital image 500 to an image encoder that includes a self-attention layer 502, a feed forward network 504, a self-attention layer 508, a cross-attention layer 510, and a feed forward network 512. Further, FIG. 5A also shows the referring expression segmentation system 102 receiving a digital text prompt 514 (e.g., that reads "man with guitar") and feeding the digital text prompt 514 to a text encoder. For instance, the text encoder includes a self-attention layer 516, a feed forward network 518, a self-attention layer 520, a cross-attention layer 522, and a feed forward network 524.

As just mentioned, the referring expression segmentation system 102 utilizes self-attention layers in the image encoder and the text encoder. Specifically, the referring expression segmentation system 102 utilizes the self-attention layers to generate encodings from vectors that represent elements within the digital image or digital text prompt. For example, the referring expression segmentation system 102 utilizes the self-attention layers to derive a query, key, and value set (e.g., Q, K, and V set).

In elaborating on the query, key, and value set, the query representation captures what the referring expression segmentation system 102 is trying to locate, the key representation encodes the input data (e.g., of the digital text prompt or the digital image), and the value representation stores the information content. Specifically, the referring expression segmentation system 102 represents each token of the digital text prompt as an embedding vector and multiplies the initial embeddings by learned weights for the query, key, and value set (e.g., to create sets of query vectors, key vectors, and value vectors). In other words, the referring expression segmentation system 102 utilizes the self-attention layers (e.g., via the query, key, and value set) to capture the relationships between different words in the digital text prompt 514 and weight the importance of each word when processing the digital text prompt 514.

As shown in FIG. 5A, the referring expression segmentation system 102 processes the digital image 500 utilizing the self-attention layer 502 and processes the digital text prompt 514 utilizing the self-attention layer 516. Specifically, the referring expression segmentation system 102 utilizes the self-attention layers 502 and 516 to generate the Q, K, and V set and further utilizes the feed forward networks 504 and 518. For example, the feed forward networks 504 and 518 include an artificial neural network (e.g., a multi-layer perceptron) that feeds information forward from an input layer, hidden layers, and an output layer. For instance, the feed forward networks 504 and 518 passes the Q, K, and V set through each layer (e.g., with the weighted sum of inputs and biases calculated at each node of each layer) and further applies one or more activation functions (e.g., Rectified Linear Unit (ReLU), Sigmoid, Hyperbolic Tangent (tanh), Leaky, ReLU, etc.).

As mentioned, the referring expression segmentation system 102 passes the Q, K, and V sets through an output layer of the feed forward networks 504 and 518 and generates an intermediary image encoding and an intermediary text encoding. In one or more embodiments, the referring expression segmentation system 102 generates an intermediary image encoding for which the referring expression segmentation system 102 further utilizes to generate an image encoding.

In other words, the intermediary image encoding refers to encodings generated by the referring expression segmentation system 102 prior to generating the image encoding (e.g., the image encoding combined with a text encoding to generate a combined encoding). For instance, the encoding generated by the self-attention layers 502 and 516 and the feed forward networks 504 and 518 includes an intermediary image encoding. Likewise, the intermediary text encoding includes the referring expression segmentation system 102 generating an encoding prior to generating the text encoding utilized to generate the combined encoding.

As further shown, the referring expression segmentation system 102 further utilizes the outputs (e.g., intermediary encodings) from the feed forward networks 504 and 518 to feed as input to the self-attention layers 508 and 520. Similarly, the referring expression segmentation system 102 utilizes the self-attention layers 508 and 520 to extract the Q, K, and V sets. Specifically, the self-attention layer 508 feeds its output to the cross-attention layer 510 but also feeds its output to the cross-attention layer 522. Likewise, the self-attention layer 520 feeds its output to the cross-attention layer 522 and the cross-attention layer 510.

In one or more embodiments, the referring expression segmentation system 102 utilizes the cross-attention layer 510 to receive as input features extracted from the text encoder and the cross-attention layer 522 to receive as input features extracted from the image encoder. For instance, a cross-attention layer includes an attention mechanism that allows the referring expression segmentation system 102 to focus on different parts of an input (e.g., focus on different parts of the digital image and focus on different parts of the digital text prompt).

Similar to the discussion above, the referring expression segmentation system 102 further utilizes the feed forward networks 512 and 524 to generate one or more outputs. Specifically, the referring expression segmentation system 102 utilizes the feed forward network 512 to generate an image encoding and the feed forward network 524 to generate a text encoding.

In some embodiments, the image encoding includes a numerical representation (e.g., a vector) of a digital image. Specifically, the image encoding captures features and properties of the digital image. For example, the image encoding includes semantic information (e.g., presence of objects, shapes, spatial relationships). Moreover, in some embodiments, the image encoding further includes features extracted from a digital text prompt, utilizing the text encoder. In other words, the referring expression segmentation system 102 leverages the cross-modality nature of the fused feature extractor to feed as input to the image encoder, text features to generate the image encoding.

In one or more embodiments, the text encoding includes a numeral representation of the text query. Specifically, the text encoding represents various aspects of the digital text prompt. For example, the text encoding indicates the presence of specific concepts, the meaning of the specific concepts, the relationship between concepts, and the context of the concepts. Further, in some embodiments, the text encoding further includes features extracted from a digital image, utilizing the image encoder. Like the image encoding, the referring expression segmentation system 102 leverages the cross-modality nature of the fused feature extractor to feed as input to the text encoder, image features to generate the image encoding.

In some embodiments, the referring expression segmentation system 102 combines the image encoding and the text encoding to generate a combined encoding 532. Specifically, the combined encoding 532 includes a numerical representation of cross-modality features. For example, the cross-modality features represent both the digital image 500 and the digital text prompt 514 in context of each other. Thus, the combined encoding 532 represents a high-quality language aware visual representation.

As further shown in FIG. 5A, the referring expression segmentation system 102 generates a cross-attention map 534 from the cross-attention layer 510. In particular, the referring expression segmentation system 102 generates the cross-attention map 534 that corresponds with the digital image 500 and features extracted from the digital text prompt 514. For example, the cross-attention map 534 includes a representation that indicates an importance or weight assigned to various regions of the digital image 500. To illustrate, the cross-attention map 534 indicates a high weight for specific object(s) relative to other object(s) within the digital image. Moreover, the referring expression segmentation system 102 utilizes the cross-attention map 534 to indicate where the fused feature extractor and the transformer model should focus their attention.

The referring expression segmentation system 102 utilizes the cross-attention layer 510 of an image encoder to generate the cross-attention map 534 from the digital image 500. Furthermore, the referring expression segmentation system 102 generates the cross-attention map 534 by receiving as input, features of the digital text prompt 514 extracted from the text encoder.

As shown, the referring expression segmentation system 102 compares the cross-attention map 534 with a ground truth mask 536 (e.g., a ground truth segmentation map). Specifically, the referring expression segmentation system 102 generates a cross-attention measure of loss by comparing the cross-attention map 534 and the ground truth mask 536 (e.g., or an inferred mask). For example, the cross-attention measure of loss assists the referring expression segmentation system 102 in localizing the cross-attention map within a specific object of the digital image.

In some embodiments, without the attention mask consistency regularization model (e.g., to determine the cross-attention measure of loss), the referring expression segmentation system 102 generates object masks with attended regions scattered across target objects and sometimes spilling over into background pixels. Specifically, to yield enhanced object masks (e.g., both object mask predictions and inferred masks at the training stage), the referring expression segmentation system 102 incorporates the attention mask consistency regularization model to localize fine-grained cross-attention within a target object.

For instance, the cross-attention measure of loss includes a localization term. Specifically, the referring expression segmentation system 102 generates a localization term for localizing the cross-attention map within an object mask prediction. In one or more embodiments, the cross-attention measure of loss further includes a collapse-reduction term. Specifically, the referring expression segmentation system 102 generates a collapse-reduction term for retaining information from the cross-attention map within an object mask prediction.

To illustrate, the referring expression segmentation system 102 represents the cross-attention loss as follows:

$$\mathcal{L}_{AMCR} = \sum_{b=1}^{N} \underbrace{\left(1 - \frac{\sum_{i,j} \mathcal{A}(i,j)\mathcal{M}(i,j)}{\sum_{i,j} \mathcal{A}(i,j)}\right)}_{\text{Localization Term}} + \underbrace{\psi \cdot KL\left(U_N(0,1) \| Q_N\right);}_{\text{Collaps-Reduction Term}}$$

$$Q_N = \left\{ \left(\frac{n(\mathcal{A})}{\sum_{i,j} \mathcal{M}(i,j)}\right)_b \forall b \in N \right\}$$

Specifically, $\mathcal{A}(i,j)$ represents the cross-attention map 534 (e.g., from the last layer of the cross-attention layer), $\mathcal{M}(i,j)$ represents the ground truth mask 536, $(i,j)$ represents pixel location, KL denotes Kullback-Leibler divergence loss, $U_N(0,1)$ denotes uniform distribution of minimum value 0 and maximum value 1, $Q_N$ represents computed normalized frequency distribution over batch with a size N. $\psi$ is the loss-balancing term empirically set to 0.001.

As shown above, the referring expression segmentation system 102 determines the localization term of the cross-attention measure of loss by taking the summation of pixel locations $(i,j)$ corresponding to each pixel of the cross-attention map 534 denoting the ground truth mask 536 divided by the summation of the pixel locations of the cross-attention map 534. Furthermore, the referring expression segmentation system 102 determines the collapse-reduction term of the cross-attention measure of loss by taking psi (ψ) combined with (e.g., multiplied) the KL divergence loss of the uniform distribution of minimum value 0 and maximum value 1 and the computed normalized frequency distribution over batch with a size N.

In one or more embodiments, the localization term guarantees accurate localization and alignment of the cross-attention map 534 within a mask of the target object (e.g., the man with the guitar). However, in some embodiments, the referring expression segmentation system 102 just utilizing the localization term results in the cross-attention map 534 collapsing within the mask of the target object. To counter this, the referring expression segmentation system 102 utilizes the collapse-reduction term.

As shown, the referring expression segmentation system 102 determines or computes $Q_N$ by combining (e.g., multiplying) the number of samples (n) with the cross-attention map 534 and further dividing that result by the summation of the ground truth mask 536. Specifically, the referring expression segmentation system 102 determines $Q_N$ for situations where b (image) is an element of N (e.g., the batch).

For example, the referring expression segmentation system 102 determines the total number of non-zero elements in $\mathcal{A}$ given by n($\mathcal{A}$) by determining the sum of the ratio $\mathcal{A}/(\mathcal{A}+\varepsilon)$ where $\varepsilon=0.0001$. In particular, the referring expression segmentation system 102 computes the ratio of n($\mathcal{A}$) to the sum of the mask M pixel values which gives the total number of non-zero values of the mask for any image b in the batch of size N. Accordingly, the referring expression segmentation system 102 collects the ratios for all the images in the batch to generate a distribution of $Q_N$ (e.g., ideally, $Q_N$ overlaps with a uniform distribution (target distribution) given by $U_N$).

As shown, the referring expression segmentation system 102 utilizes a transformer encoder 530 and a transformer decoder 528 to generate an object mask prediction 538. Specifically, the referring expression segmentation system 102 compares the object mask prediction 538 with the ground truth mask 536 to determine the cross-entropy measure of loss.

For example, the referring expression segmentation system 102 generates a cross-entropy measure of loss between an object mask prediction and a ground truth mask or an inferred mask. In other words, a cross-entropy measure of loss includes either a ground truth measure of loss or a pseudo measure of loss. For instance, the cross-entropy measure of loss includes a logarithmic loss that quantifies a difference between the object mask prediction and the ground truth or inferred mask. Specifically, the referring expression segmentation system 102 utilizes binary cross-entropy loss or categorical cross-entropy loss.

As indicated in the collapse-reduction term above, the referring expression segmentation system 102 minimizes the KL divergence loss between $Q_N$ and $U_N$ and further combines (e.g., adds) the cross-attention measure of loss (e.g., including the localization term and the collapse-reduction term) to a cross-entropy measure of loss. Specifically, the referring expression segmentation system 102 determines or generates a combined measure of loss (e.g., a final measure of loss) represented as:

$$\mathcal{L}_{total} - \mathcal{L}_{CE} + \lambda \cdot \mathcal{L}_{AMCR}$$

For instance, the referring expression segmentation system 102 utilizes λ for weighting the $\mathcal{L}_{AMCR}$ loss term. Gamma scheduling was discussed above in FIG. 3 (e.g., regarding balancing the amount of ground truth masks against the inferred masks during semi-supervised training).

Figure 5B:
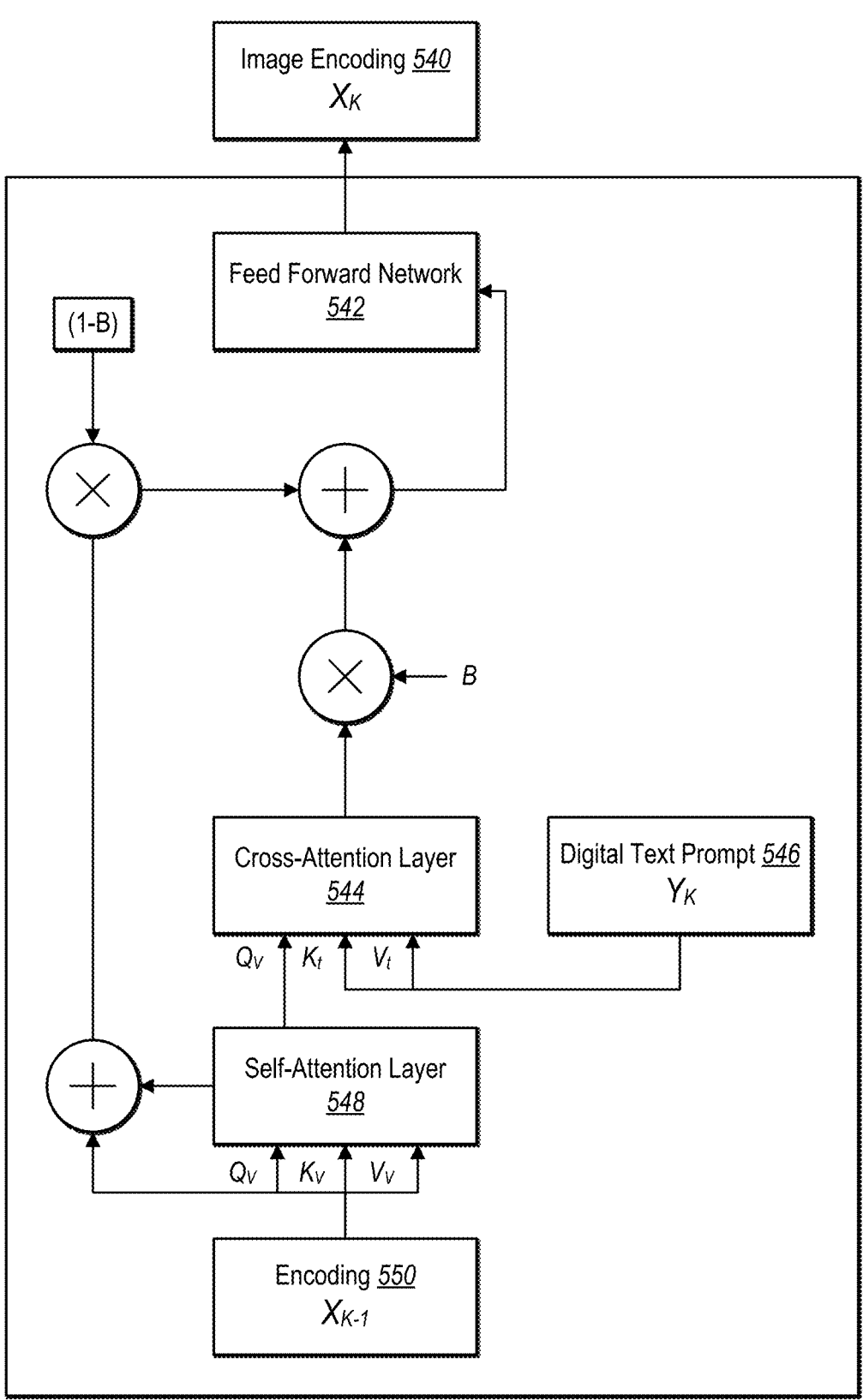

FIG. 5B shows additional details of the architectural components discussed above in FIG. 5A. Specifically, FIG. 5B illustrates the referring expression segmentation system 102 capturing cross-modality features. In prior systems, a simple concatenation-based encoding strategy fails to capture cross-modal interactions (language and vision) and results in poor fine-grained multi-modal representations. To counter this, the referring expression segmentation system 102 overcomes the issue of failing to capture cross-modal interactions by utilizing a lightweight fusion mechanism through normalized gated cross-attention into the layers of uni-modal feature extractors to learn high-quality language aware visual representations.

As shown in FIG. 5B, the referring expression segmentation system 102 receives an encoding 550 and splits the encoding 550 input into a Q, K, V set via a self-attention layer 548 (e.g., FIG. 5B shows the second part of the fused feature extractor containing the cross-attention layer in FIG. 5A). Specifically, the referring expression segmentation system 102 feeds an output (e.g., an intermediary encoding) of the self-attention layer 548 to combine with the encoding 550 ($X_{k-1}$) (e.g., generating a combined intermediary encoding). For example, the referring expression segmentation system 102 combines (e.g., multiplies) the combined intermediary encoding with $(1-\beta)$ (e.g., to generate an additional combined intermediary encoding).

Further, FIG. 5B shows the referring expression segmentation system 102 feeding the Query value of the encoding 550 to a cross-attention layer 544 along with the key value and the value of a digital text prompt 546 ($Y_k$). Moreover, the referring expression segmentation system 102 combines (multiplies) the output from the cross-attention layer 544 with a beta parameter (e.g., a learnable weighted gating parameter initialized from 0). Additionally, FIG. 5B shows the referring expression segmentation system 102 taking the combined output (e.g., from the cross-attention layer 544 with a beta parameter) and further combining the combined output with the additional combined intermediary encoding). As shown, the referring expression segmentation system 102 then utilizes a feed forward network 542 to generate an image encoding 540.

For example, the referring expression segmentation system 102 represents the architecture shown in FIG. 5B as:

$$\tilde{x}_k = S\text{-}MHA(x_{k-1})$$

$$x_k = x_k + (1-\beta) * \tilde{x}_k + \beta * C\text{-}MHA(\tilde{x}_y, y_k)$$

$$x_k = x_k + FFN(x_k)$$

For instance, $x_{k-1}$ represents the output from the $(k-1)^{th}$ layer and S-MHA and C-MHA represent the self and cross multi-head attention. Further, FFN represents the cross feed forward network and beta represents the learned weighted gating parameter. In other words, the output from the self-attention layer 548 is represented by $\tilde{x}_k$ and the output from the cross-attention layer 544 is represented by $x_k$. Accordingly, as described above, the referring expression segmentation system 102 utilizes the gated methodology to preserve the uni-modal embeddings and ensures the mapping of linguistic semantic features to localized parts of the digital image to make the referring expression segmentation system 102 more capable of understanding the fine-grained visual features of the objects.

Although the description of FIGS. 5A and 5B involve the referring expression segmentation system 102 at training time, in one or more embodiments, the principles described in FIGS. 5A and 5B also apply to the referring expression segmentation system 102 at inference time (e.g., excluding the measures of loss and modification of parameters). Specifically, at inference time, the referring expression segmentation system 102 generates an image encoding from a digital image and features extracted from a digital text prompt utilizing the text encoder of the fused feature extractor. Likewise, the referring expression segmentation system 102 generates a text encoding from the digital text prompt and features extracted from the digital image utilizing the image encoder. For example, the referring expression segmentation system 102 generates a combined encoding from the image encoding and the text encoding and further generates an object mask from the combined encoding.

Furthermore, in some embodiments, the referring expression segmentation system 102 provides the object mask prediction that overlays the digital image to a client device. Specifically, the referring expression segmentation system 102 provides via a graphical user interface of the client device the object mask prediction that overlays the digital image and allows for further input (e.g., to further modify the digital text prompt, to manually adjust the object mask prediction, etc.).

Moreover, in some embodiments, the referring expression segmentation system 102 applies the same principles for segmenting target objects in digital images for segmenting target objects in digital videos. Specifically, the referring expression segmentation system 102 considers video frames as a sequence of digital images without involving any temporal information and generates one or more object mask predictions.

Additionally, in one or more embodiments, the referring expression segmentation system 102 incorporates into various inpainting and/or out-painting pipelines. Some prior systems require multiple steps to replace an object within a digital image (e.g., input the mask of the object and an expression with which they want to replace the object with). However, in one or more embodiments, the referring expression segmentation system 102 allows a computing system to receive a single textual prompt that includes the two just mentioned steps (e.g., replace the dog on the left with a standing man). Specifically, the referring expression segmentation system 102 would mask the dog on the left and utilizing an existing inpainting pipeline to inpaint the standing man.

Figure 6A:
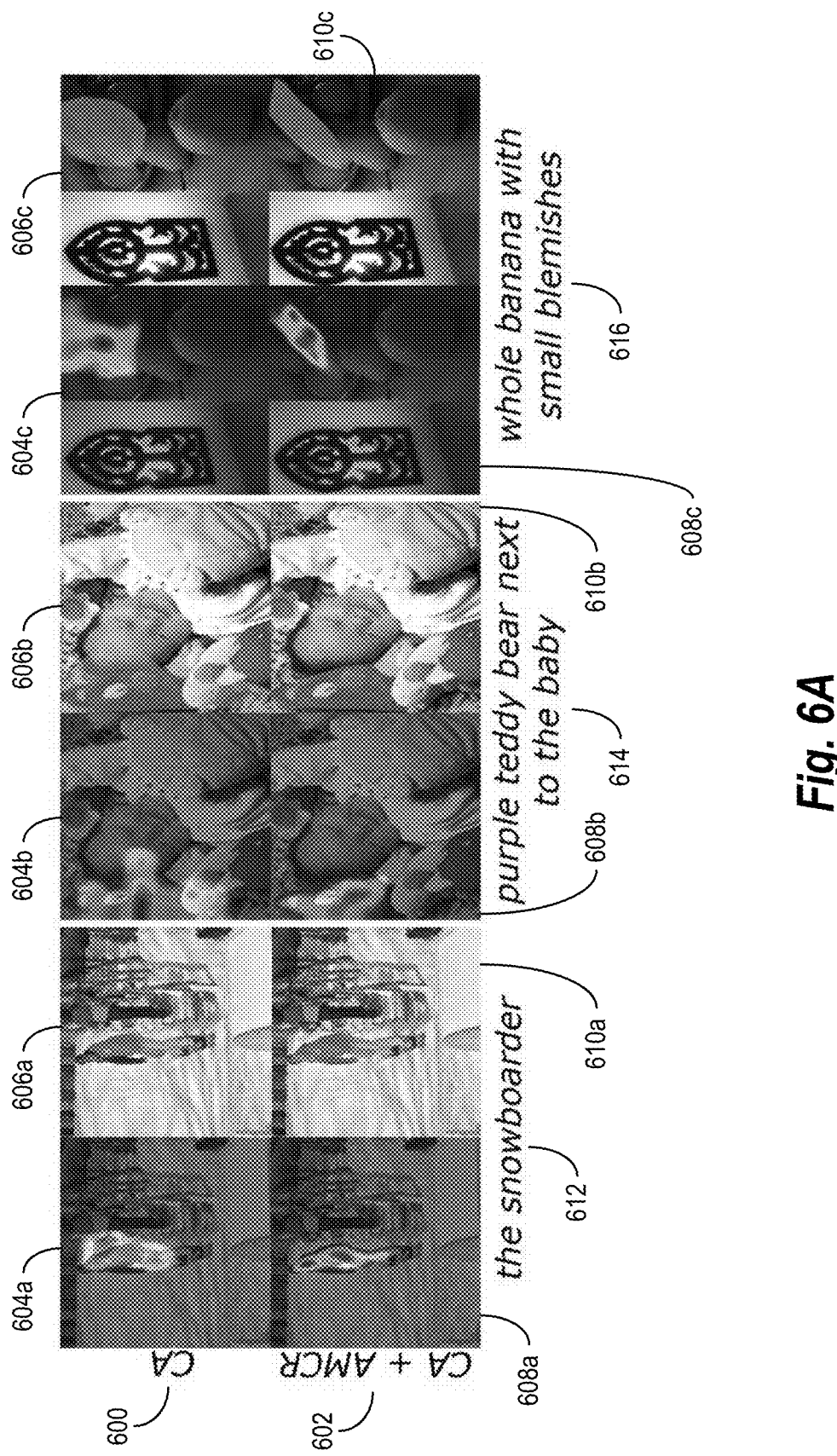

FIG. 6A shows examples of qualitative differences of the referring expression segmentation system 102 with using the cross-attention measure of loss and without using the cross-attention measure of loss. In other words, FIG. 6A illustrates the referring expression segmentation system 102 generating higher-quality object masks (that more accurately conforms with the target object) by utilizing the cross-attention measure of loss.

As shown, FIG. 6A shows a top row 600 that represents the referring expression segmentation system 102 generating cross-attention maps and object mask predictions (without the attention mask consistency regularization model). Further, FIG. 6A also shows a bottom row 602 that represents the referring expression segmentation system 102 generating cross-attention maps and object mask predictions utilizing the attention mask consistency regularization model. Specifically, FIG. 6A shows for a digital text prompt 612 (the snowboarder), the referring expression segmentation system 102 generates a cross-attention map 604*a* and an object mask prediction 606*a*. For example, the cross-attention map 604*a* and the object mask prediction 606*a* inaccurately spills into background elements and do not completely localize into the target object (e.g., the snowboarder). In contrast, a cross-attention map 608*a* and an object mask prediction 610*a* accurately localizes to the target object and does not spill into the background elements of the digital image.

Moreover, FIG. 6B shows for a digital text prompt 614 (purple teddy bear next to the baby) a cross-attention map 604*b* and an object mask prediction 606*b* that does not accurately localize to the target object (the purple teddy bear). In contrast, a cross-attention map 608*b* and an object mask prediction 610*b* accurately localizes to the purple teddy bear. Likewise, for a digital text prompt 616 (whole banana with small blemishes, FIG. 6A shows a cross-attention map 604*c* and an object mask prediction 606*c* inaccurately spilling into the background elements of the digital image. In contrast, a cross-attention map 608*c* and an object mask prediction 610*c* accurately localizes to the target object of a whole banana with small blemishes. Thus, FIG. 6A demonstrates that the referring expression segmentation system 102 utilizing the attention mask consistency regularization model enhances the accuracy of the cross-attention map and the object mask prediction.

FIG. 6B illustrates the impact of the cross-attention measure of loss on training sets with different labeling rates (e.g., ground truth annotations). Specifically, FIG. 6B shows the impact of cross-attention based fusion (e.g., the fused feature extractor) and the attention mask consistency regularization model. For example, the referring expression segmentation system 102 including the cross-attention based fusion consistently improves the mIoU across varying label rates (e.g., a 100% label-rate that includes the cross-attention based fusion improves the mIoU from 68.84 to 72.41; a 10% label-rate that includes the cross-attention based fusion improves the mIoU from 54.06-60.11). Furthermore, as shown in FIG. 5B, the attention mask consistency regularization model improves the mIoU from 72.41 to 73.35 (for 100% label-rate), from 64.72 to 67.04 (for 30% label rate) and from 60.11 to 64.02 (for 10% label-rate).

FIG. 7 illustrates an example diagram comparing prior systems with the referring expression segmentation system 102 generating object mask predictions for a target object referred to by text. Specifically, FIG. 7 shows varying label rates (100% mask and bounding box, 30%, 20% and 10%). For example, FIG. 7 shows that the referring expression segmentation system 102 outperforms existing methods on each of the datasets by a significant margin (e.g., greater than 6.09 mIoU for the best performing prior system for a fully supervised dataset; greater than 1.24 mIoU for 30% label-rate; greater than 0.93 mIoU for 20% label-rate; and greater than 0.03 for a 10% label-rate).

As shown, in some instances, the referring expression segmentation system 102 (SAFARI) outperforms fully supervised prior methods (LTS and VLT) when utilizing weakly supervised models (e.g., 67.04 mIoU for the referring expression segmentation system 102 compared to 65.43 and 65.65 mIoU for the prior systems).

FIG. 8 shows an example diagram of the referring expression segmentation system 102 in zero-shot settings as compared to prior systems. Specifically, FIG. 8 shows that the referring expression segmentation system 102 achieves significant gains in zero-shot settings from both datasets (Ref- DAVIS17 and JHMDB). For example, the referring expression segmentation system 102 (with the Swin-B backbone) outperforms prior methods by 7.2 mIoU and 0.8 mIoU for fully supervised models and by 3.4 mIoU and 2.1 mIoU for weakly supervised models. Additionally, although not shown in FIG. 8, in one or more embodiments, semi-supervised retraining with mask validity filtering significantly improves the mIoU values. Specifically, the mask validity filtering results in improvements of 4.36 mIoU.

Figure 9:
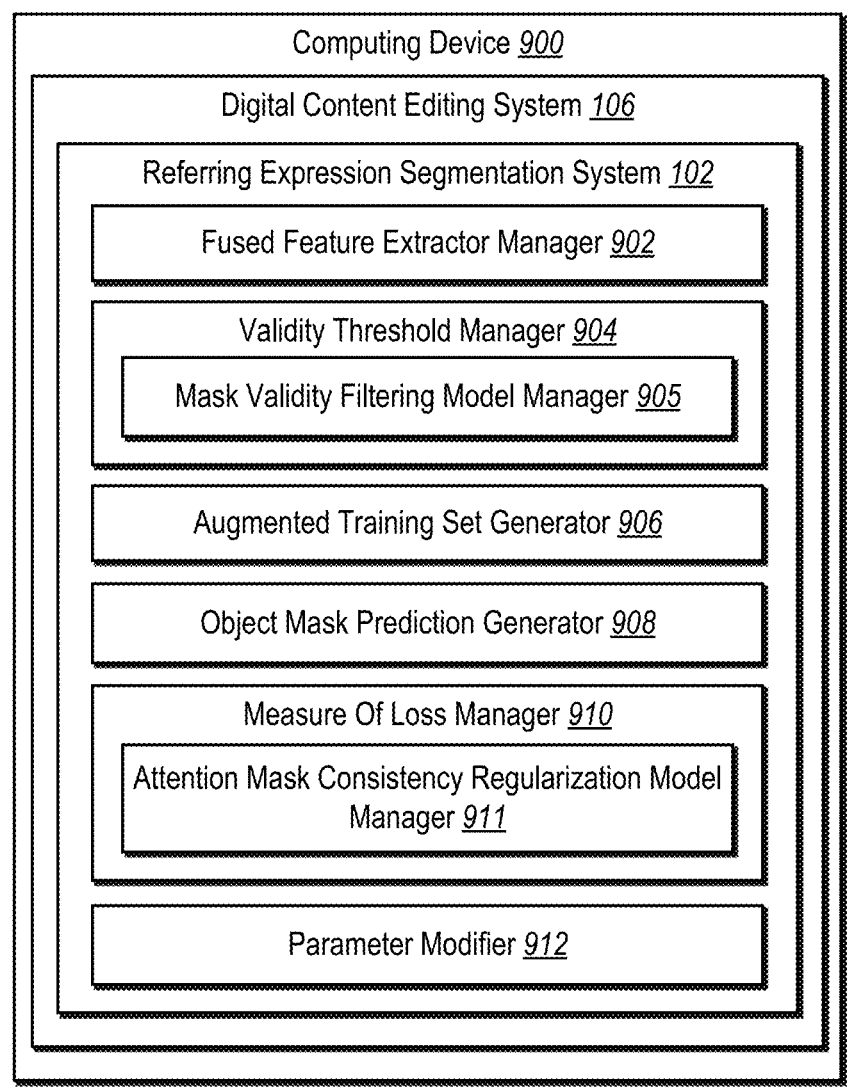
FIG. 9 illustrates a schematic diagram of the referring expression segmentation system in accordance with one or more implementations.

Turning to FIG. 9, additional detail will now be provided regarding various components and capabilities of the referring expression segmentation system 102. In particular, FIG. 9 illustrates an example schematic diagram of a computing device 900 (e.g., the server(s) 104 and/or the client device 116) implementing the referring expression segmentation system 102 in accordance with one or more embodiments of the present disclosure for components 900-912. As illustrated in FIG. 9, the referring expression segmentation system 102 includes a fused feature extractor manager 902, a validity threshold manager 904, a mask validity filtering model manager 905, an augmented training set generator 906, an object mask prediction generator 908, a measure of loss manager 910, an attention mask consistency regularization model manager 911, and a parameter modifier 912.

The fused feature extractor manager 902 generates inferred masks from digital images and also generates object mask predictions. For example, the fused feature extractor manager 902 utilizes a fused feature extractor that includes text encoders and image encoders to generate inferred masks and/or object mask predictions. Furthermore, the fused feature extractor manager 902 manages the cross-modality architecture of the fused feature extractor. For instance, the fused feature extractor manager 902 feeds as input text features to a cross-attention layer of an image encoder (and vice-versa).

The validity threshold manager 904 validates one or more inferred masks. For example, the validity threshold manager 904 identifies a subset of the inferred masks as satisfying the validity threshold. Further, in some embodiments, the validity threshold manager 904 utilizes mask validity filtering to determine whether an inferred mask fits within a bounding box of an identified object proposal. Moreover, in some embodiments, the validity threshold manager 904 establishes a threshold score for the inferred mask to satisfy.

In addition, the mask validity filtering model manager 905 manages the specific mask validity filtering pipeline. For example, the mask validity filtering model manager 905 utilizes an object detection model and a natural language model. Further, the mask validity filtering model manager 905 utilizes a spatial reasoning model. Moreover, in some embodiments, the mask validity filtering model manager 905 validates whether an inferred mask satisfy the validity threshold.

The augmented training set generator 906 generates an augmented training set. For example, the augmented training set generator 906 generates an augmented training set by combining the subset of the inferred masks with a training set that includes ground truth masks. Furthermore, the augmented training set generator 906 allows the referring expression segmentation system 102 to train in a weakly-supervised manner.

The object mask prediction generator 908 generates an object mask prediction. For example, the object mask prediction generator 908 generates an object mask prediction from the augmented training set. For instance, the object mask prediction generator 908 generates an object mask prediction from training triplets that include the ground truth masks or the inferred masks. Thus, in some embodiments, the object mask prediction generator 908 interacts with components such as the augmented training set generator 906 to obtain the training samples.

The measure of loss manager 910 determining measures of loss. For example, the measure of loss manager 910 determines ground truth and pseudo measures of loss. For instance, the measure of loss manager 910 compares one or more object mask predictions with one or more inferred masks and one or more ground truth masks from the augmented training set to determine the measures of loss.

The attention mask consistency regularization model manager 911 further determines a cross-attention measure of loss. For example, the attention mask consistency regularization model manager 911 generates a cross-attention map of the digital image and compares the cross-attention map with a ground truth mask. Further, in some embodiments, the attention mask consistency regularization model manager 911 determines the cross-attention measure of loss and modifies parameters by utilizing the parameter modifier 912.

The parameter modifier 912 modifies parameters of one or more models. For example, the parameter modifier 912 modifies parameters of the fused feature extractor (e.g., the cross-attention layer or the self-attention layer) and the transformer model (e.g., the transformer encoder or the transformer decoder). Further, the parameter modifier 912 modifies parameters based on the ground truth and pseudo measures of loss.

Each of the components 902-912 of the referring expression segmentation system 102 can include software, hardware, or both. For example, the components 902-912 can include one or more instructions stored on a computer-readable storage medium and executable by processors of one or more computing devices, such as a client device or server device. When executed by the one or more processors, the computer-executable instructions of the referring expression segmentation system 102 can cause the computing device(s) to perform the methods described herein. Alternatively, the components 902-912 can include hardware, such as a special-purpose processing device to perform a certain function or group of functions. Alternatively, the components 902-912 of the referring expression segmentation system 102 can include a combination of computer-executable instructions and hardware.

Furthermore, the components 902-912 of the referring expression segmentation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 of the referring expression segmentation system 102 may be implemented as a stand-alone application, such as a desktop or mobile application. Furthermore, the components 902-912 of the referring expression segmentation system 102 may be implemented as one or more web-based applications hosted on a remote server. Alternatively, or additionally, the components 902-912 of the referring expression segmentation system 102 may be implemented in a suite of mobile device applications or "apps." For example, in one or more embodiments, the referring expression segmentation system 102 can comprise or operate in connection with digital software applications such as ADOBE® EXPRESS®, ADOBE® PHOTOSHOP®, ADOBE® PREMIERE®, and/or ADOBE® FIREFLY®.

FIGS. 1-9, the corresponding text, and the examples provide a number of different methods, systems, devices, and non-transitory computer-readable media of the 902-912. In addition to the foregoing, one or more embodiments can also be described in terms of flowcharts comprising acts for accomplishing the particular result, as shown in FIG. 10. FIG. 10 may be performed with more or fewer acts. Further, the acts may be performed in different orders. Additionally, the acts described herein may be repeated or performed in parallel with one another or in parallel with different instances of the same or similar acts.

FIG. 10 illustrates a flowchart of a series of acts 1000 for modifying parameters in accordance with one or more embodiments. FIG. 10 illustrates acts according to one embodiment, alternative embodiments may omit, add to, reorder, and/or modify any of the acts shown in FIG. 10. In some implementations, the acts of FIG. 10 are performed as part of a method. For example, in some embodiments, the acts of FIG. 10 are performed as part of a computer-implemented method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one memory device. The system further includes at least one server device configured to cause the system to perform the acts of FIG. 10.

The series of acts 1000 includes an act 1002 of generating inferred masks from digital images and digital text prompts. Further, the series of acts 1000 includes an act 1004 of identifying a subset of the inferred masks satisfying a validity threshold. Moreover, the act 1004 includes a sub-act 1004*a* of utilizing a mask validity filter model. Moreover, the series of acts 1000 includes an act 1006 of generating an augmented training set by combining the subset of the inferred masks with a training set. Moreover, the series of acts 1000 includes an act 1010 of determining ground truth and pseudo measures of loss. Further, the act 1010 includes a sub-act 1010*a* of comparing one or more object mask predictions with one or more inferred masks and one or more ground truth masks. Additionally, the series of acts 1000 includes an act 1012 of modifying parameters of the fused feature extractor based on measures of loss.

In particular, the act 1002 includes generating, utilizing a fused feature extractor, inferred masks from digital images and digital text prompts. Further, the act 1004 includes identifying a subset of the inferred masks satisfying a validity threshold. Moreover, the act 1006 includes generating an augmented training set by combining the subset of the inferred masks with a training set comprising ground truth masks. Further, the act 1008 includes generating, utilizing the fused feature extractor, object mask predictions from the augmented training set. Moreover, the act 1010 includes determining ground truth and pseudo measures of loss by comparing one or more object mask predictions with one or more inferred masks and one or more ground truth masks from the augmented training set. Additionally, the act 1012 includes modifying parameters of the fused feature extractor based on the ground truth and pseudo measures of loss.

For example, in one or more embodiments, the series of acts 1000 includes generating, utilizing an image encoder, an image encoding from a digital image and features extracted from a digital text prompt utilizing a text encoder. In addition, in one or more embodiments, the series of acts 1000 includes generating, utilizing the text encoder, a text encoding from the digital text prompt and features extracted from the digital image utilizing the image encoder. Further, in one or more embodiments, the series of acts 1000 includes generating a combined encoding from the image encoding and the text encoding. Further, in some embodiments, the series of acts 1000 includes generating, utilizing a transformer model, an inferred mask that overlays the digital image based on the combined encoding.

Moreover, in one or more embodiments, the series of acts 1000 includes detecting one or more objects within a digital image corresponding to an inferred mask. Further, in one or more embodiments, the series of acts 1000 includes generating similarity scores between the one or more objects within the digital image and a digital text prompt corresponding to the inferred mask. Moreover, in one or more embodiments, the series of acts 1000 includes identifying, utilizing a spatial reasoning model, an object from the one or more objects within the digital image based on the similarity scores and a spatial reference in the digital text prompt corresponding to the inferred mask. Further, in one or more embodiments, the series of acts 1000 includes comparing the identified object with the inferred mask to determine that the inferred mask matches a location of the identified object within the digital image.

Moreover, in one or more embodiments, the series of acts 1000 includes combining digital text prompts and digital images corresponding with the subset of the inferred masks satisfying the validity threshold with the training set. Additionally, in one or more embodiments, the series of acts 1000 includes wherein the training set further comprises digital images and digital text prompts corresponding with the ground truth masks. Moreover, in one or more embodiments, series of acts 1000 includes generating, utilizing a cross-attention layer of an image encoder, a cross-attention map from a digital image and a digital text prompt of the augmented training set. Further, in one or more embodiments, the series of acts 1000 includes comparing the cross-attention map with a ground truth mask or an inferred mask.

Furthermore, in one or more embodiments, the series of acts 1000 includes generating a cross-attention measure of loss between the cross-attention map and the ground truth mask to localize the cross-attention map within a specific object indicated by the digital text prompt. Moreover, in one or more embodiments, the series of acts 1000 includes modifying parameters of the fused feature extractor and a transformer model based on the cross-attention measure of loss.

Moreover, in one or more embodiments, the series of acts 1000 includes generating a cross-attention measure of loss between the cross-attention map and the ground truth mask or the inferred mask. Further, in one or more embodiments, the series of acts 1000 includes generating a combined measure of loss by combining a cross-attention measure of loss with a cross-entropy loss to modify parameters of the fused feature extractor and a transformer model. Moreover, in one or more embodiments, the series of acts 1000 includes wherein the ground truth masks of the augmented training set corresponds to less than half of the augmented training set. Further, in one or more embodiments, the series of acts 1000 includes assigning a first weight to the subset of the inferred masks that is greater than a second weight assigned to the ground truth masks. Moreover, in some embodiments, the series of acts 1000 includes modifying the parameters of the fused feature extractor based on the first weight and the second weight.

FIG. 11 illustrates a flowchart of a series of acts 1100 for modifying parameters of a cross-attention layer and a transformer model in accordance with one or more embodiments.

FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium can store instructions thereon that, when executed by at least one processor, cause a computing device to perform the acts of FIG. 11. In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of generating a cross-attention map from a digital image and a digital text prompt that indicates a specific object within the digital image. Moreover, the act 1102 includes a sub-act 1102*a* of utilizing a cross-attention layer to generate the cross-attention map. Further, the series of acts 1100 includes an act 1104 of comparing the cross-attention map with a ground truth segmentation map. Moreover, the series of acts 1100 includes an act 1106 of generating a cross-attention measure of loss between the cross-attention map and the ground truth segmentation map. Further, the act 1106 includes a sub-act 1106*a* of localizing the cross-attention map within the specific object based on the cross-attention measure of loss. Moreover, the series of acts 1100 includes an act 1108 of modifying parameters of the cross-attention layer of the image encoder and a transformer model.

In particular, the act 1102 includes generating, utilizing a cross-attention layer of an image encoder, a cross-attention map from a digital image and a digital text prompt that indicates a specific object within the digital image. Further, the act 1104 includes comparing the cross-attention map with a ground truth segmentation map of the digital image. Moreover, the act 1106 includes generating a cross-attention measure of loss between the cross-attention map and the ground truth segmentation map to localize the cross-attention map within the specific object. Further, the act 1108 includes modifying parameters of the cross-attention layer of the image encoder and a transformer model based on the cross-attention measure of loss.

In addition, in one or more embodiments, the series of acts 1100 includes generating the cross-attention map from the digital image and features extracted from the digital text prompt utilizing a text encoder. Further, in one or more embodiments, the series of acts 1100 includes generating the cross-attention measure of loss by generating a localization term for localizing the cross-attention map within an object mask prediction. Moreover, in one or more embodiments, the series of acts 1100 includes generating the cross-attention measure of loss by generating a collapse-reduction term for retaining information from the cross-attention map within an object mask prediction.

Further, in one or more embodiments, the series of acts 1100 includes generating a combined measure of loss by combining a cross-entropy measure of loss with the cross-attention measure of loss that comprises a localization term and a collapse-reduction term. Moreover, in one or more embodiments, the series of acts 1100 includes modify the parameters of the cross-attention layer and the transformer model with the combined measure of loss.

FIG. 12 illustrates a flowchart of a series of acts 1200 for generating an object mask in accordance with one or more embodiments. FIG. 12 illustrates acts according to one embodiment, alternative embodiments may omit, add to, reorder, and/or modify any of the acts shown in FIG. 12. In some implementations, the acts of FIG. 12 are performed as part of a method. For example, in some embodiments, the acts of FIG. 12 are performed as part of a computer-implemented method. Alternatively, a non-transitory computer-readable medium can store instructions thereon that, when executed by at least one processor, cause a computing device to perform the acts of FIG. 12. In some embodiments, a system performs the acts of FIG. 12. For example, in one or more embodiments, a system includes at least one memory device. The system further includes at least one server device configured to cause the system to perform the acts of FIG. 12.

The series of acts 1200 includes an act 1202 of generating an image encoding from a digital image and features extracted from a digital image and features extracted from a digital text prompt utilizing a text encoder. Further, the act 1202 includes a sub-act 1202*a* of utilizing an image encoder to generate the image encoding. Further, the series of acts 1200 includes an act 1204 of generating a text encoding from the digital text prompt and features extracted from the digital image utilizing the image encoder. Additionally, the act 1204 includes a sub-act 1204*a* of utilizing a text encoder to generate the text encoding. Moreover, the series of acts 1200 includes an act 1206 of generating a combined encoding. Further, the series of acts 1200 includes an act 1208 of generating an object mask that overlays the digital image based on the combined encoding.

In particular, the act 1202 includes generating, utilizing an image encoder, an image encoding from a digital image and features extracted from a digital text prompt utilizing a text encoder. Further, the act 1204 includes generating, utilizing a text encoder, a text encoding from the digital text prompt and features extracted from the digital image utilizing the image encoder. Moreover, the act 1206 includes generating a combined encoding from the image encoding and the text encoding. Further, the act 1208 includes generating, utilizing a transformer model, an object mask that overlays the digital image based on the combined encoding.

Further, in one or more embodiments, the series of acts 1200 includes generating, utilizing a self-attention layer of the image encoder, an intermediary image encoding. Moreover, in one or more embodiments, the series of acts 1200 includes generating, utilizing a self-attention layer of the text encoder, an intermediary text encoding.

Moreover, in one or more embodiments, the series of acts 1200 includes generating, utilizing a cross-attention layer of the image encoder, the image encoding from the intermediary image encoding and the intermediary text encoding, wherein the intermediary text encoding is fed to the cross-attention layer of the image encoder from the text encoder. Further, in one or more embodiments, the series of acts 1200 includes generating, utilizing a cross-attention layer of the text encoder, the text encoding from the intermediary text encoding and the intermediary image encoding, wherein the intermediary image encoding is fed to the cross-attention layer of the text encoder from the image encoder. Moreover, in one or more embodiments, the series of acts 1200 includes generating the object mask utilizing an encoder-decoder pair of the transformer model. Further, in one or more embodiments, the series of acts 1200 includes providing, via a graphical user interface of a client device, the object mask that overlays the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
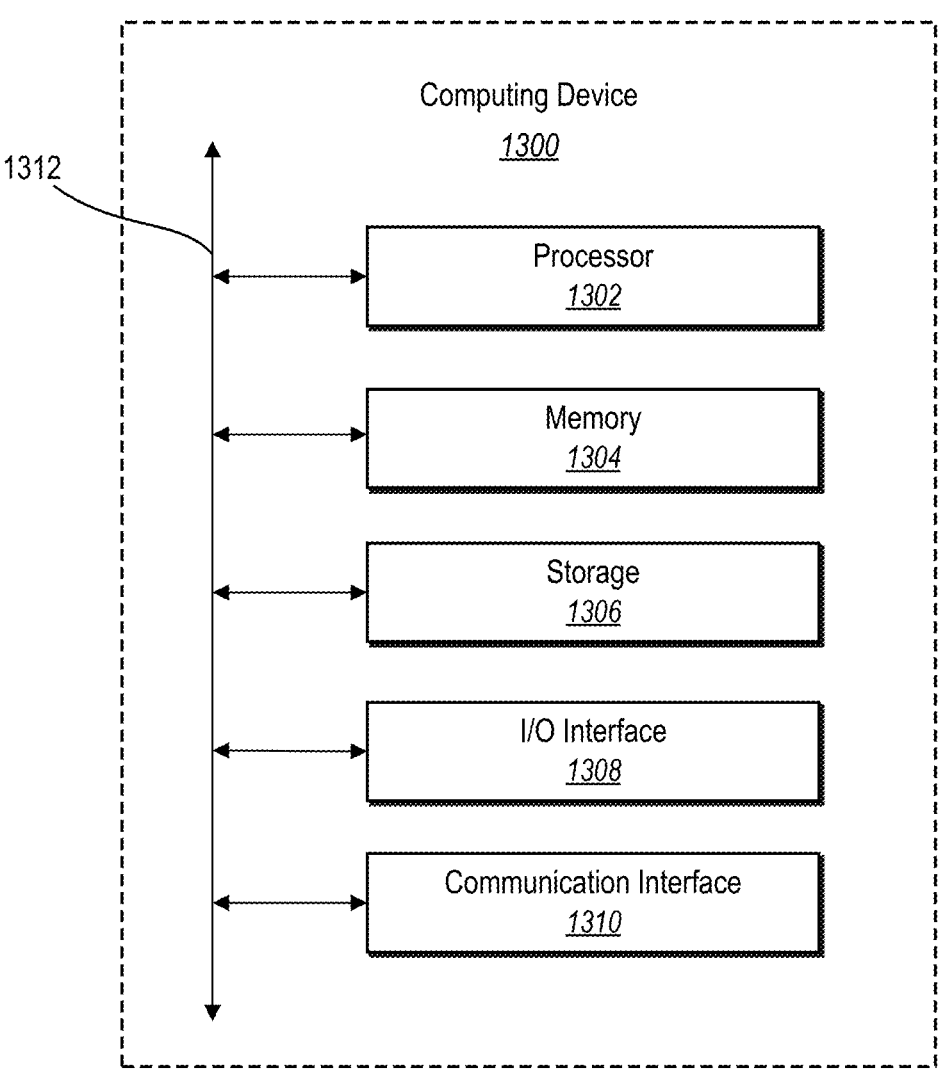
FIG. 13 illustrates a block diagram of an exemplary computing device in accordance with one or more implementations.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 104 and/or the client device 116). In one or more embodiments, the computing device 1300 may be a mobile device (e.g., a mobile telephone, a smartphone, a PDA, a tablet, a laptop, a camera, a tracker, a watch, a wearable device). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 include hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 including storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed:

1. A computer-implemented method comprising:
generating, utilizing a fused feature extractor, inferred masks from digital images and digital text prompts;
identifying a subset of the inferred masks satisfying a validity threshold;
generating an augmented training set by combining the subset of the inferred masks with a training set comprising ground truth masks;
generating, utilizing the fused feature extractor, object mask predictions from the augmented training set;
determining ground truth and pseudo measures of loss by comparing one or more object mask predictions with one or more inferred masks and one or more ground truth masks from the augmented training set; and
modifying parameters of the fused feature extractor based on the ground truth and pseudo measures of loss.

2. The computer-implemented method of claim 1, wherein generating the inferred masks from the digital images and the digital text prompts further comprises:
generating, utilizing an image encoder, an image encoding from a digital image and features extracted from a digital text prompt utilizing a text encoder; and
generating, utilizing the text encoder, a text encoding from the digital text prompt and features extracted from the digital image utilizing the image encoder.

3. The computer-implemented method of claim 2, further comprising:
generating a combined encoding from the image encoding and the text encoding; and
generating, utilizing a transformer model, an inferred mask that overlays the digital image based on the combined encoding.

4. The computer-implemented method of claim 1, wherein identifying the subset of the inferred masks satisfying the validity threshold further comprises:

detecting one or more objects within a digital image corresponding to an inferred mask; and generating similarity scores between the one or more objects within the digital image and a digital text prompt corresponding to the inferred mask.

5. The computer-implemented method of claim 4, further comprising:

identifying, utilizing a spatial reasoning model, an object from the one or more objects within the digital image based on the similarity scores and a spatial reference in the digital text prompt corresponding to the inferred mask; and comparing the identified object with the inferred mask to determine that the inferred mask matches a location of the identified object within the digital image.

6. The computer-implemented method of claim 1, wherein:

generating the augmented training set further comprises combining digital text prompts and digital images corresponding with the subset of the inferred masks satisfying the validity threshold with the training set; and the training set further comprises digital images and digital text prompts corresponding with the ground truth masks.

7. The computer-implemented method of claim 1, wherein generating, utilizing the fused feature extractor, the object mask predictions further comprises:

generating, utilizing a cross-attention layer of an image encoder, a cross-attention map from a digital image and a digital text prompt of the augmented training set; and comparing the cross-attention map with a ground truth mask or an inferred mask.

8. The computer-implemented method of claim 7, further comprising:

generating a cross-attention measure of loss between the cross-attention map and the ground truth mask to localize the cross-attention map within a specific object indicated by the digital text prompt; and modifying parameters of the fused feature extractor and a transformer model based on the cross-attention measure of loss.

9. The computer-implemented method of claim 7, further comprising:

generating a cross-attention measure of loss between the cross-attention map and the ground truth mask or the inferred mask; and generating a combined measure of loss by combining a cross-attention measure of loss with a cross-entropy loss to modify parameters of the fused feature extractor and a transformer model.

10. The computer-implemented method of claim 1, wherein the ground truth masks of the augmented training set corresponds to less than half of the augmented training set.

11. The computer-implemented method of claim 1, further comprising:

assigning a first weight to the subset of the inferred masks that is greater than a second weight assigned to the ground truth masks; and modifying the parameters of the fused feature extractor based on the first weight and the second weight.

12. A system comprising:

one or more memory devices; and one or more processors coupled to the one or more memory devices, the one or more processors configured to cause the system to perform operations comprising:

generating, utilizing a fused feature extractor, inferred masks from digital images and digital text prompts;

identifying a subset of the inferred masks satisfying a validity threshold;

generating an augmented training set by combining the subset of the inferred masks with a training set comprising ground truth masks;

generating, utilizing the fused feature extractor, object mask predictions from the augmented training set;

determining ground truth and pseudo measures of loss by comparing one or more object mask predictions with one or more inferred masks and one or more ground truth masks from the augmented training set; and modifying parameters of the fused feature extractor based on the ground truth and pseudo measures of loss.

13. The system of claim 12, wherein generating, utilizing the fused feature extractor, the object mask predictions further comprises:

generating, utilizing a cross-attention layer of an image encoder, a cross-attention map from a digital image and a digital text prompt of the augmented training set; and comparing the cross-attention map with a ground truth mask or an inferred mask.

14. The system of claim 13, wherein the operations further comprise:

generating a cross-attention measure of loss between the cross-attention map and the ground truth mask to localize the cross-attention map within a specific object indicated by the digital text prompt; and modifying parameters of the fused feature extractor and a transformer model based on the cross-attention measure of loss.

15. The system of claim 14, wherein generating the cross-attention measure of loss comprises generating a collapse-reduction term for retaining information from the cross-attention map within an object mask prediction.

16. The system of claim 15, wherein the operations further comprise:

generating a combined measure of loss by combining a cross-entropy measure of loss with the cross-attention measure of loss that comprises a localization term and the collapse-reduction term; and modifying the parameters of the cross-attention layer and the transformer model with the combined measure of loss.

17. A non-transitory computer-readable medium storing executable instructions which, when executed by at least one processing device, cause the at least one processing device to perform operations comprising:

generating, utilizing a fused feature extractor, inferred masks from digital images and digital text prompts;

identifying a subset of the inferred masks satisfying a validity threshold;

generating an augmented training set by combining the subset of the inferred masks with a training set comprising ground truth masks;

generating, utilizing the fused feature extractor, object mask predictions from the augmented training set;

determining ground truth and pseudo measures of loss by comparing one or more object mask predictions with one or more inferred masks and one or more ground truth masks from the augmented training set; and modifying parameters of the fused feature extractor based on the ground truth and pseudo measures of loss.

18. The non-transitory computer-readable medium of claim 17, wherein generating the inferred masks from the digital images and the digital text prompts further comprises:

generating, utilizing an image encoder, an image encoding from a digital image and features extracted from a digital text prompt utilizing a text encoder; and generating, utilizing the text encoder, a text encoding from the digital text prompt and features extracted from the digital image utilizing the image encoder.

19. The non-transitory computer-readable medium of claim 18, wherein the operations further comprise:

generating a combined encoding from the image encoding and the text encoding; and generating, utilizing a transformer model, an inferred mask that overlays the digital image based on the combined encoding.

20. The non-transitory computer-readable medium of claim 19, wherein identifying the subset of the inferred masks satisfying the validity threshold further comprises:

detecting one or more objects within a digital image corresponding to an inferred mask; and generating similarity scores between the one or more objects within the digital image and a digital text prompt corresponding to the inferred mask.

\* \* \* \* \*